(12) United States Patent
Kawar

(10) Patent No.: US 7,549,505 B1
(45) Date of Patent: Jun. 23, 2009

(54) ACOUSTIC NOISE REDUCTION DEVICE FOR ELECTRONIC EQUIPMENT, INCLUDING PERSONAL COMPUTERS

(76) Inventor: Maher S. Kawar, 408 Nicholas Dr., Mountain View, CA (US) 94043

( * ) Notice: Subject to any disclaimer, the term of this patent is extended or adjusted under 35 U.S.C. 154(b) by 0 days.

(21) Appl. No.: 11/952,869

(22) Filed: Dec. 7, 2007

Related U.S. Application Data

(63) Continuation of application No. 11/346,719, filed on Feb. 2, 2006, now abandoned.

(60) Provisional application No. 60/650,431, filed on Feb. 4, 2005, provisional application No. 60/723,796, filed on Oct. 5, 2005.

(51) Int. Cl.
B64F 1/26 (2006.01)

(52) U.S. Cl. ..................... 181/210; 181/202

(58) Field of Classification Search ............. 181/202, 181/210
See application file for complete search history.

(56) References Cited

U.S. PATENT DOCUMENTS

| | | | | |
|---|---|---|---|---|
| 1,640,192 | A * | 8/1927 | Henry | 215/354 |
| 1,772,263 | A * | 8/1930 | Payne | 57/235 |
| 2,870,858 | A * | 1/1959 | Adams | 181/202 |
| 3,477,067 | A * | 11/1969 | Aileo | 2/209 |
| 3,540,547 | A | 11/1970 | Coward et al. | |
| 3,747,735 | A | 7/1973 | Frick et al. | |
| 3,935,923 | A | 2/1976 | Wheeler | |
| 3,947,148 | A | 3/1976 | Holt | |
| 3,960,237 | A * | 6/1976 | Sleeper | 181/200 |
| 3,976,393 | A | 8/1976 | Larson | |
| 3,980,912 | A | 9/1976 | Panza | 310/51 |
| 4,095,668 | A * | 6/1978 | Derka | 181/202 |
| 4,137,333 | A * | 1/1979 | Daswick | 426/120 |
| 4,258,821 | A * | 3/1981 | Wendt et al. | 181/202 |
| 4,266,602 | A * | 5/1981 | White et al. | 165/124 |
| 4,279,325 | A * | 7/1981 | Challis | 181/211 |
| 4,328,904 | A * | 5/1982 | Iverson | 220/229 |
| 4,330,047 | A * | 5/1982 | Ruspa et al. | 181/224 |
| 4,508,486 | A | 4/1985 | Tinker | |
| 4,657,143 | A * | 4/1987 | Forbes, Jr. | 229/217 |
| 4,671,450 | A * | 6/1987 | Lopez | 229/120.17 |
| 4,750,860 | A | 6/1988 | Kelley | |
| 4,807,718 | A | 2/1989 | Lotz | |

(Continued)

FOREIGN PATENT DOCUMENTS

JP 04-261252 A1 9/1992

*Primary Examiner*—Jeffrey Donels
*Assistant Examiner*—Forrest M Phillips
(74) *Attorney, Agent, or Firm*—David Pressman

(57) ABSTRACT

An acoustic noise reduction accessory device is attachable to or integral with a personal computer or other electronic equipment. The device reduces acoustic noise emitted from the rear of the equipment, in particular the acoustic noise from fans. The device comprises an acoustic barrier or shielding member. The barrier is shaped in various forms external to the computer or integrally extending from its back around one or more fans of the computer so as to reduce airflow minimally. Acoustic absorbing material is layered upon the acoustic barrier and may be combined with vibration-absorbing material. The barrier may be shaped from a solid or flexible member(s) to accommodate different-sized electronics and formed to include baffles and structures to direct airflow while absorbing noise. Also it may be made adjustable by one or more slidable members. The device is easily assembled and collapsible for storage.

20 Claims, 18 Drawing Sheets

U.S. PATENT DOCUMENTS

| | | | |
|---|---|---|---|
| 4,892,413 A * | 1/1990 | Vats | 366/349 |
| 4,968,048 A * | 11/1990 | Lortie | 280/47.19 |
| 5,098,013 A * | 3/1992 | France et al. | 229/115 |
| 5,101,321 A | 3/1992 | Remise et al. | |
| 5,274,200 A * | 12/1993 | Das et al. | 181/202 |
| 5,432,306 A * | 7/1995 | Pfordresher | 181/198 |
| 5,508,477 A | 4/1996 | Kato et al. | |
| 5,526,228 A * | 6/1996 | Dickson et al. | 361/695 |
| 5,580,625 A * | 12/1996 | Capy et al. | 428/35.2 |
| 5,732,140 A * | 3/1998 | Thayer | 381/300 |
| 5,965,851 A * | 10/1999 | Herreman et al. | 181/200 |
| 6,006,476 A | 12/1999 | Zarnick | |
| 6,029,769 A * | 2/2000 | Tichy | 181/136 |
| 6,045,037 A * | 4/2000 | McGeehin | 229/125.39 |
| 6,086,476 A | 7/2000 | Paquin | |
| 6,104,608 A * | 8/2000 | Casinelli et al. | 361/692 |
| 6,135,875 A * | 10/2000 | French | 454/184 |
| 6,141,213 A * | 10/2000 | Antonuccio et al. | 361/687 |
| 6,149,052 A * | 11/2000 | Mueller | 229/183 |
| 6,167,976 B1 * | 1/2001 | O'Neill et al. | 180/69.2 |
| 6,198,627 B1 | 3/2001 | Roehling et al. | |
| 6,273,213 B1 | 8/2001 | Calla et al. | |
| 6,343,734 B1 * | 2/2002 | Smith | 229/87.19 |
| 6,454,527 B2 | 9/2002 | Nishiyama et al. | |
| 6,459,578 B1 | 10/2002 | Wagner | |
| 6,481,527 B1 * | 11/2002 | French et al. | 181/201 |
| 6,511,016 B2 * | 1/2003 | Bar et al. | 244/3.24 |
| 6,537,490 B2 * | 3/2003 | Han | 415/119 |
| 6,722,466 B1 * | 4/2004 | Tong et al. | 181/200 |
| 6,766,879 B2 * | 7/2004 | Eilers | 181/200 |
| 6,805,219 B2 * | 10/2004 | Yasuda et al. | 181/204 |
| 6,880,813 B2 * | 4/2005 | Yazici et al. | 261/29 |
| 6,892,851 B2 * | 5/2005 | Lee | 181/224 |
| 6,932,190 B2 * | 8/2005 | Sishtla | 181/290 |
| 6,953,104 B2 | 10/2005 | Monson et al. | |
| 7,055,734 B2 * | 6/2006 | Provus et al. | 229/141 |
| 7,159,620 B2 * | 1/2007 | Kissell | 138/149 |
| 7,261,146 B2 * | 8/2007 | Oh | 165/135 |
| 7,314,113 B2 * | 1/2008 | Doll | 181/225 |
| 7,357,219 B2 * | 4/2008 | Mafi et al. | 181/202 |
| 7,379,298 B2 * | 5/2008 | Walsh et al. | 361/692 |
| 7,379,299 B2 * | 5/2008 | Walsh et al. | 361/695 |
| 7,382,632 B2 * | 6/2008 | Alo et al. | 361/825 |
| 2001/0001433 A1 * | 5/2001 | Lee | 181/290 |
| 2002/0083681 A1 * | 7/2002 | Fahs et al. | 53/412 |
| 2003/0047375 A1 * | 3/2003 | Jennings | 181/129 |
| 2003/0116576 A1 * | 6/2003 | Lang-Boecker | 220/738 |
| 2003/0183446 A1 | 10/2003 | Shah et al. | |
| 2003/0192945 A1 * | 10/2003 | Quaintance | 229/109 |
| 2004/0070504 A1 * | 4/2004 | Brollier et al. | 340/572.8 |
| 2004/0134712 A1 * | 7/2004 | Lee | 181/224 |
| 2005/0056481 A1 * | 3/2005 | Mafi et al. | 181/202 |
| 2005/0168939 A1 | 8/2005 | Lijima et al. | |
| 2005/0176567 A1 * | 8/2005 | Menta et al. | 493/55 |
| 2005/0268867 A1 | 12/2005 | Kern et al. | |
| 2006/0037630 A1 * | 2/2006 | Griffin et al. | 134/42 |
| 2006/0043161 A1 * | 3/2006 | Provus et al. | 229/141 |
| 2006/0054380 A1 * | 3/2006 | Doll | 181/225 |
| 2006/0185931 A1 * | 8/2006 | Kawar | 181/202 |
| 2007/0056796 A1 * | 3/2007 | Marlowe | 181/199 |
| 2007/0125593 A1 * | 6/2007 | Hashizume | 181/225 |
| 2007/0295794 A1 * | 12/2007 | Bestehorn et al. | 229/125.19 |
| 2008/0023260 A1 * | 1/2008 | Eilers | 181/200 |
| 2008/0048509 A1 * | 2/2008 | Murakami et al. | 310/51 |
| 2008/0099541 A1 * | 5/2008 | Smith et al. | 229/109 |

* cited by examiner

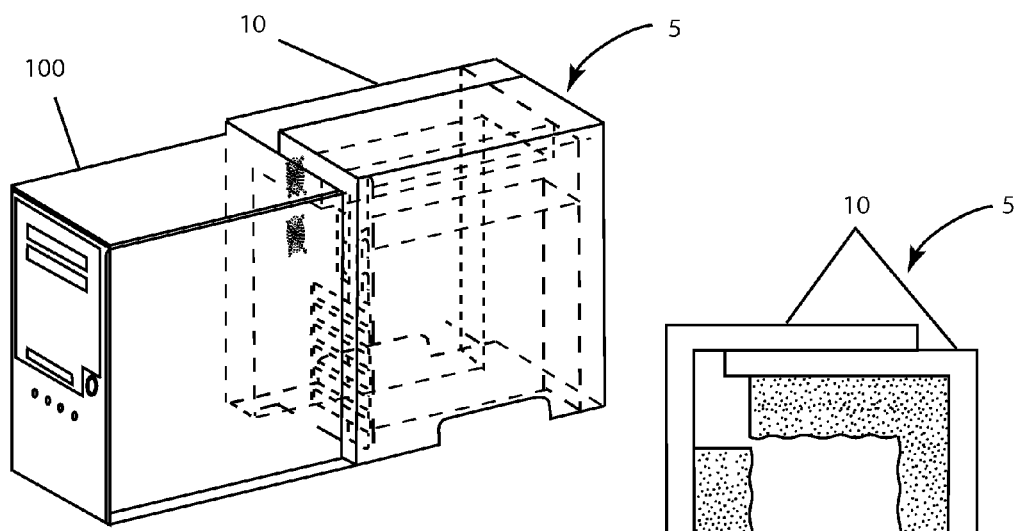
FIG. 8
FIG. 9
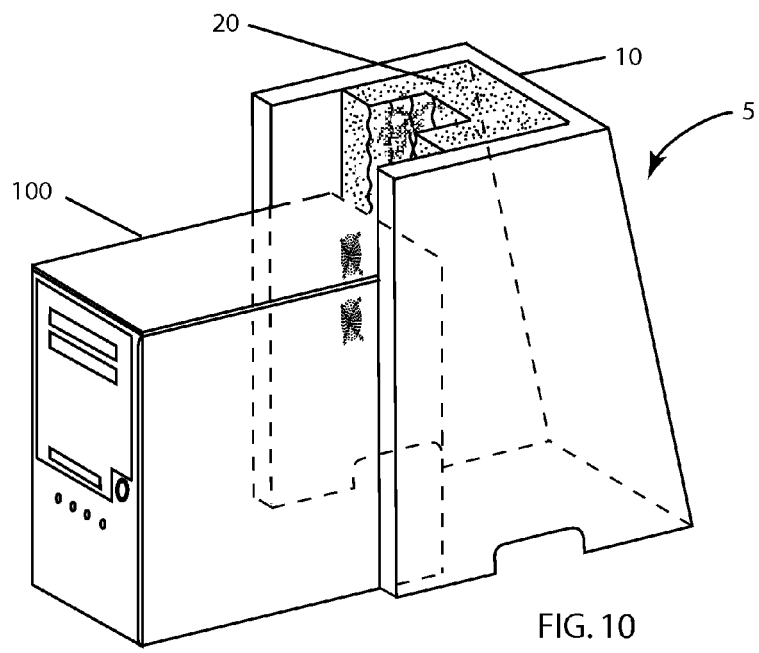
FIG. 10

ACOUSTIC NOISE REDUCTION DEVICE FOR ELECTRONIC EQUIPMENT, INCLUDING PERSONAL COMPUTERS

CROSS-REFERENCE TO RELATED APPLICATIONS

This application is a continuation of application Ser. No. 11/346,719, filed 2006 Feb. 2, now abandoned, which application claims priority of my U.S. Provisional Application Ser. Nos. 60/650,431, filed 2005 Feb. 4, and 60/723,796, filed 2005 Oct. 5, which are incorporated herein by reference in their entirety.

BACKGROUND

1. Field

The field is acoustic noise reduction of electronic equipment, in particular, acoustic reduction of fan noise emitted from personal computers and other electronic equipment with negligible air flow impediment.

2. Prior Art

Computers and other electronic equipment which utilize air circulating or cooling fans and other electronic devices generate noise. This noise, usually emitted from the rear of such devices, can be annoying, bringing about a desire to minimize such noise. Previous solutions have attempted to create lower-noise-generating fans. However, such fans, when used as replacements, are inconvenient to attach, requiring tools and extra elements such as screws or bolts. Disassembly of the computer or the equipment is also often needed. Once installed, such a fan is inconvenient to remove as this requires further time and tools. Other techniques include installing an external device, such as a "PC hood," made of plastic, onto the backs of PCs to cover the fans. However, such devices reduce airflow and air pressure of the fans. In addition, such devices require tools and cannot be easily disassembled or adapted to different sizes of electronic equipment.

Therefore there is a need for an acoustic noise reducing device to reduce noise generated by fans without significantly minimizing the necessary airflow from the fans. There is also a need for such a device which can be quickly assembled and which does not require tools or extra implements to assemble, which can accommodate different sizes of electronic equipment, and which can be easily transported.

ADVANTAGES

It is accordingly an advantage of one or more aspects to reduce acoustic noise generated by fans associated with personal computers, PCs, and other electronic devices. A further advantage is to provide minimal to negligible airflow reduction through the electronic device. Another advantage is to provide an acoustic reduction or silencer accessory device that can be attached to electronic equipment very quickly and easily, for instance in about 90 seconds or less, and that attaches externally without the need to power off or disassemble anything on the equipment.

Other advantages of one or more aspects are to provide such a device which is adjustable to accommodate different widths and sizes of computers, to provide a reusable device that can accommodate different and upgraded PCs to avoid purchase of any new devices when a new PC is purchased, to provide a device that installs without other elements or tools, to provide a device that is easily transported, and that can be recycled and that is environment friendly.

Still further advantages of one or more aspects will become apparent from a consideration of the ensuing description and drawings.

SUMMARY

According to one embodiment an acoustic noise reduction accessory device is attachable or made integral to a personal computer or other electronic equipment. The device can be used with a low-acoustic-noise fan, as the device will further reduce the acoustic noise emitted from the fan. The device reduces acoustic noise emitted from the rear of the computer in general and in particular reduces the acoustic noise from the air-circulating fans.

The device allows the airflow rate to be maintained, avoiding a 90-degree turn of airflow with virtually no reduction in airflow rate. For some embodiments there are configurations where the airflow will need to be either turned or restricted to some minimal amount, resulting in only minimal airflow reduction. The device installs in short amount of time, for example 90 seconds or less, without tools, bolts or screws and is adjustable to devices of different sizes.

In one embodiment, the device comprises an acoustic barrier or shield member. The barrier is shaped in various forms externally of the computer or integrally extending from the back portion of the computer around the one or more fans. The acoustic barrier member causes minimum to negligible airflow reduction by leaving air pathways from the fans. In addition, an acoustic absorbing material is layered upon the acoustic barrier and may be combined with vibration-absorbing material in various forms and shapes. The barrier may be shaped to accommodate different sized electronic devices and formed to include baffles and structures to direct airflow while absorbing noise.

In other embodiments, the device may be made adjustable by one or more slidable members or can be made adjustable by the material and shape used for the acoustic barrier. The device is adjustable for different widths of the tower chassis of personal computers and/or the positioning of the fans.

The device can be installed without disassembly and reassembly of the PC and it does not require disconnection of any equipment cables. The device simply attaches to the external part of existing personal computer or electronics without tools or extra pieces. Furthermore, the device may be removed from the equipment easily and minimized or collapsed for transporting or storing the device or minimizing packaging size, thus saving on space and costs. In addition, components of the device may be manufactured from recyclable materials.

DRAWINGS

FIG. 8 shows an isometric view of the device as it is assembled onto a computer illustrating the device extending to the bottom of the computer, according to another embodiment.

FIG. 9 shows a back view of the device of FIG. 8.

FIG. 10 shows an isometric view of the device assembled onto a computer, extending to the bottom of the computer, according to another embodiment.

FIG. 11b shows a back view of the device of FIG. 11a.

FIG. 12b shows an isometric back view of the device of FIG. 12a.

FIG. 14b shows an exploded isometric view of the device of FIG. 14a.

FIG. 14c shows a back view of the device of FIG. 14a.

FIG. 15c shows an exploded isometric view of the device of FIG. 15a.

FIG. 16b shows a top view of the device of FIG. 16a.

FIG. 17b shows a detail side view of the detail 17b of FIG. 17a.

FIG. 19b shows a side view of the device of FIG. 19a.

FIG. 20b shows a side view of the device of FIG. 20a.

FIG. 22b shows a back view of the device of FIG. 22a.

REFERENCE NUMERALS

| | |
|---|---|
| 5 | acoustic noise reduction device |
| 10 | acoustic barrier (shield) |
| 20 | acoustic absorbing material |
| 30 | vibration absorbing material |
| 40 | hook-and-loop (h&l) material or fastener |
| 50 | double sided tape |
| 60 | acoustic absorbing material plates |
| 70 | hard base material |
| 80 | straps |
| 90 | high-friction vibration absorption material |
| 95 | wall |
| 100 | PC or other electronic device |
| 110 | fans |
| 120 | door - barrier |
| 130 | hinges |
| 140 | slide or guide rails |
| 160 | side panel h&l fastener |
| 200 | solid cantilever panel |
| 210 | flexible composite panel |
| 220 | composite panel |

DETAILED DESCRIPTION

Figure 1A:
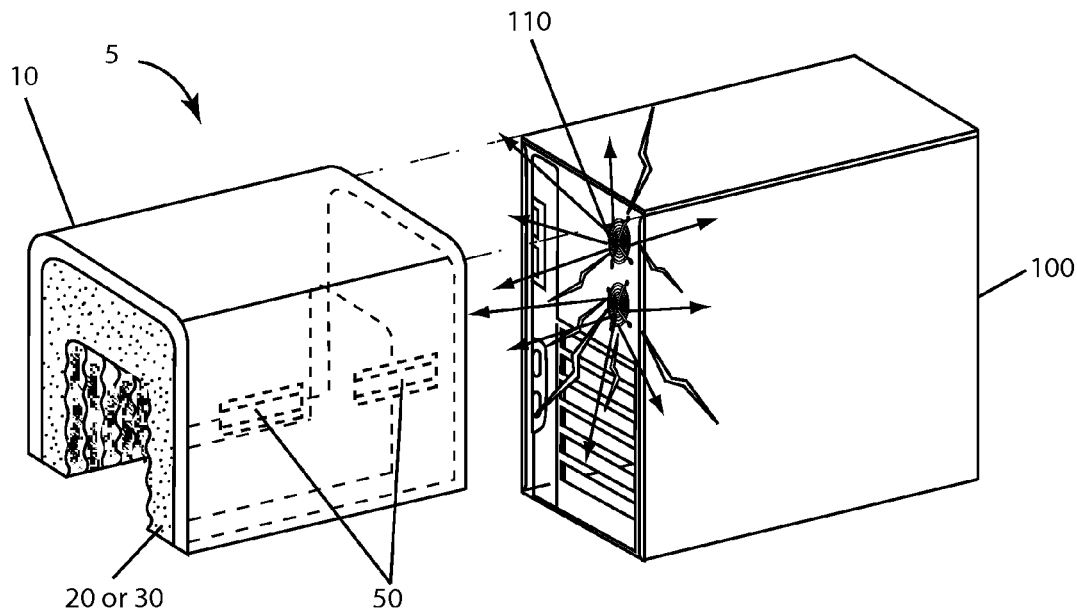
FIG. 1a shows an isometric view of a noise-reducing device separate from a computer prior to attachment, according to one embodiment.
Figure 1B:
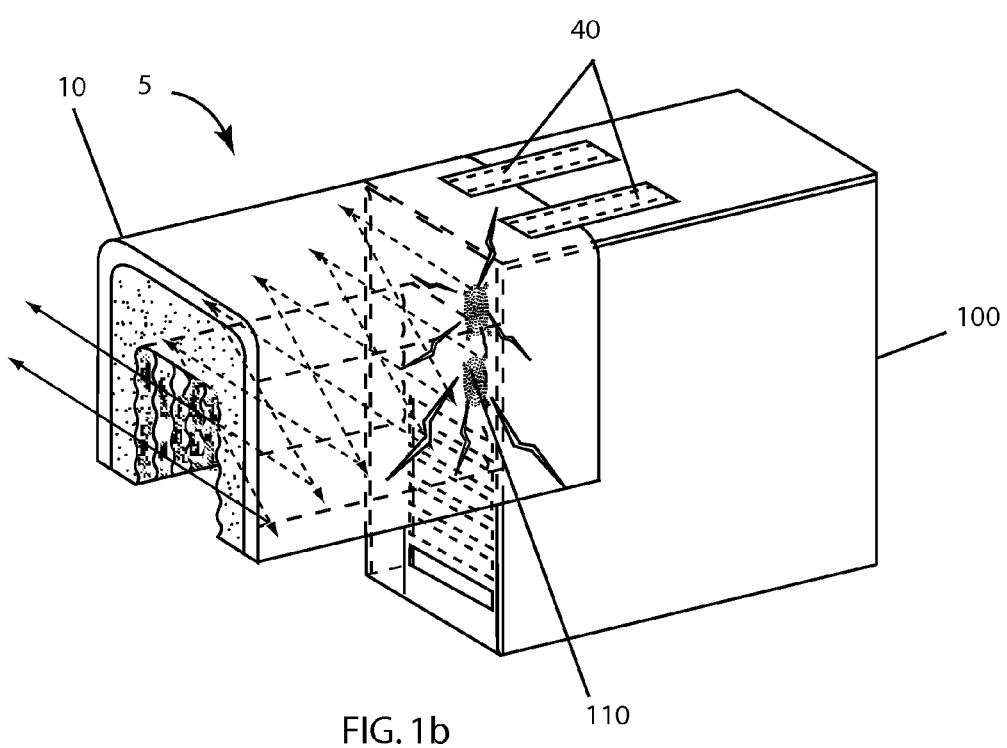
FIG. 1b is an isometric view of the device of FIG. 1a assembled to the back of the computer.

FIGS. 1a and 1b—Upside-Down U-Shaped ANR

FIGS. 1a and 1b show a first embodiment of an acoustic noise-reduction (ANR) device, cover, or hood 5 attached to an electronic device such as a personal computer (PC) 100. Device 5 can be attached to the PC with a variety of different types of attachments. These comprise double-sided tape, a hook-and-loop (h&l) fastener 40, stretch straps or adjustable straps which wrap around the PC, magnets, the weight of device 5 itself, and other appropriate attachment means.

In a preferred embodiment, device 5 comprises a sheet of acoustic reflecting material 10 having an inner surface upon which a lining of a sheet of acoustic absorbing material 20 is placed. Acoustic reflecting material 10 will also be referred to as acoustic (noise) barrier, reflector, or shield interchangeably. Naturally, the more reflector 10 weighs per unit area, the better a barrier it will be. Reflector 10 may comprise sheet metal or other metal types, plastics, rubber, copper or metal filled rubber, wood, processed wood, leather, vinyl, any other acoustic reflecting (shielding) material, or a combination of these materials. Reflector 10 or other parts of the device which are positioned on the sides of the PC may include or be lined with vibration absorbing material 30 or acoustic absorbing material 20.

Acoustic absorbing material 20 will also be referred to as acoustic noise reduction material or absorber. Absorber 20 may be attached to reflector 10 by any known method, such as sewing, adhesive, bonding, clipping, stapling, glue-gun-heated adhesives, or any other of several commonly known methods. Absorber 20 is placed on the back, fans side, of the PC. As stated, absorber 20 is accompanied or lines reflector 10 (also referred to as shielding or an acoustic barrier).

Absorber 20 may be selected from materials comprising foam, fiberglass, rubber, batting material, open-cell melamine foams, polyurethanes, urethanes, thermoplastics, and any other type of acoustic absorbing material or combination of these materials. Absorber 20 may have a variety of surface textures and contours and may have a shape other than a flat surface on the inside of reflector 10 where the absorption takes place. Such surfaces may be in the form of triangular wedges (horizontal or vertical or a combination of this), pyramids, semi-dome and valley shapes; which may be in a repetitive geometric shape. Such a surface may also be in the shape of totally random hills and valleys such as those similar to landscape or iceberg hills and valleys. Absorber 20 reduces acoustic noise by absorbing it as a sponge absorbs a liquid. It reduces the noise by transforming the air pressure waves of the noise into vibration energy and in turn transforming this energy into heat energy, thus dissipating part of the sound and thereby reducing the noise level).

Reflector 10 reflects the sound back to absorber 20 for further noise reduction by absorption in absorber 20. Some acoustic noise will escape this second absorption process, back into the atmosphere, and will be reflected to the wall on the other side of reflector 10 and the same process will take place again. This acoustic noise energy will continue to be reflected back and forth, losing energy with each reflection, until it leaves the device through the openings at a reduced noise level.

As stated, in lieu of or in combination with sound absorber 20, vibration absorbing material 30 may be placed on the inside surface of reflector 10 by double-sided adhesive tape 50 or bonding material. Vibration absorber 30 has high-performance damping characteristics. It may comprise polyurethanes, urethanes, thermoplastics and other damping materials such as damping foams and combinations thereof.

Acoustic noise is generated in all directions from the fan or fans in PC 100. Some of the embodiments are structured to 1) encompass the fan(s) with noise absorption materials, but yet allow enough air passage ways for minimal air flow loss, and 2) encompass the fan(s) in the form of a cylinder, box, or the like with both ends open to minimize air flow loss, with acoustic absorbing materials surrounding the air flow, thus minimizing the air flow loss. The embodiments are configured for assembly on the back of PCs, or other electronic devices, where the fans are located.

Figure 2:
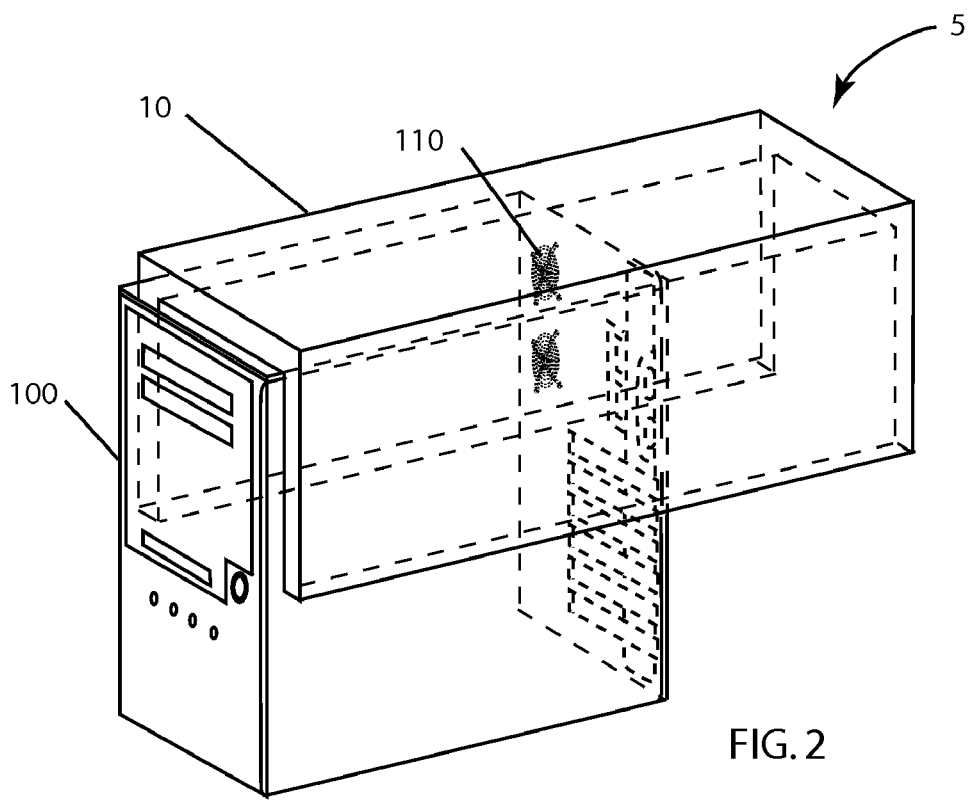
FIG. 2 shows an isometric view of a configuration of the device as it is assembled onto a computer according to another embodiment.

FIG. 2—Full-Length ANR Device

FIG. 2 shows the device covering the majority of the sides of PC 100 and extending (cantilevering over) beyond the back of PC 100. This configuration has a cross-sectional shape of an upside-down U. Absorber 20 is provided on the inside of device 5 in the section beyond the back, as shown in FIG. 1a. Either vibration reduction 30 or sound absorber 20 may be positioned between the sides of the PC and the device as shown in FIG. 1a. This configuration is attached to the PC from the top and sides and sits off the ground.

Figure 3:
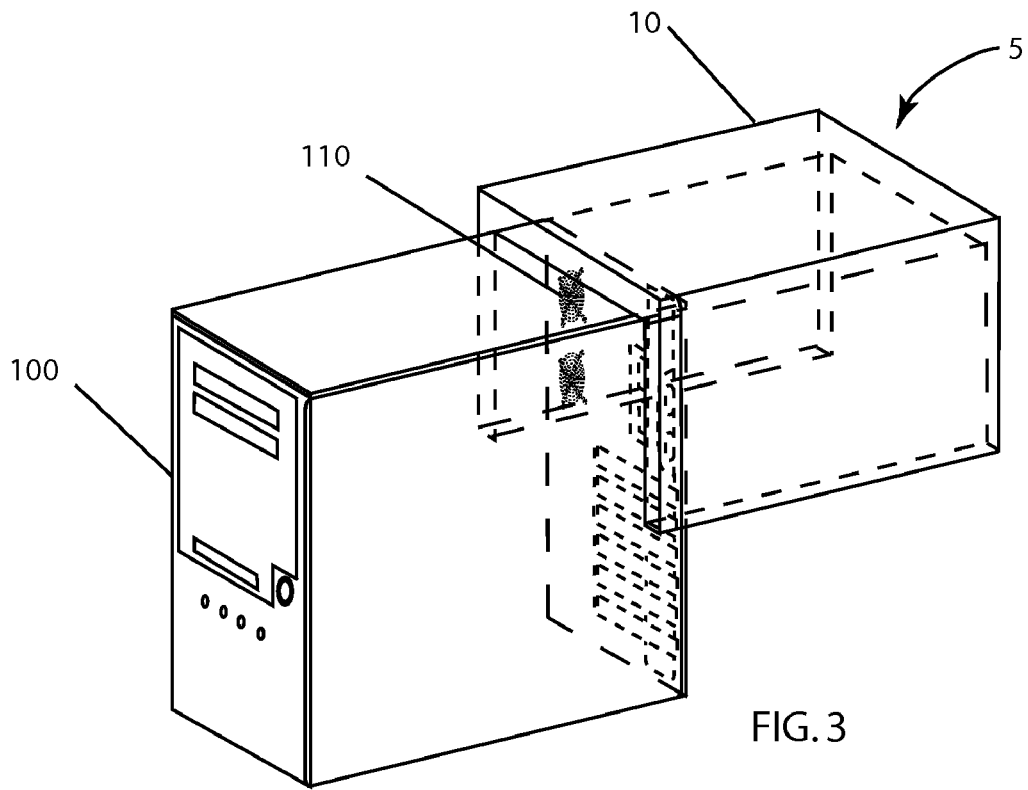
FIG. 3 shows an isometric view of the device as it is assembled onto a computer illustrating an extension from the rear of the computer, according to another embodiment.

FIG. 3—Cantilevered Half-Length ANR Device

FIG. 3 shows an embodiment of device 5 extending beyond the back of PC 100. This configuration does not cover the sides of the PC as in FIG. 2 above. This configuration also has the cross-sectional shape of an upside-down U. Absorber 20 is on the inside of the device in the section beyond the back as shown in FIG. 1a. This configuration is attached to the PC from the top and sides and sits off the ground.

Figure 4:
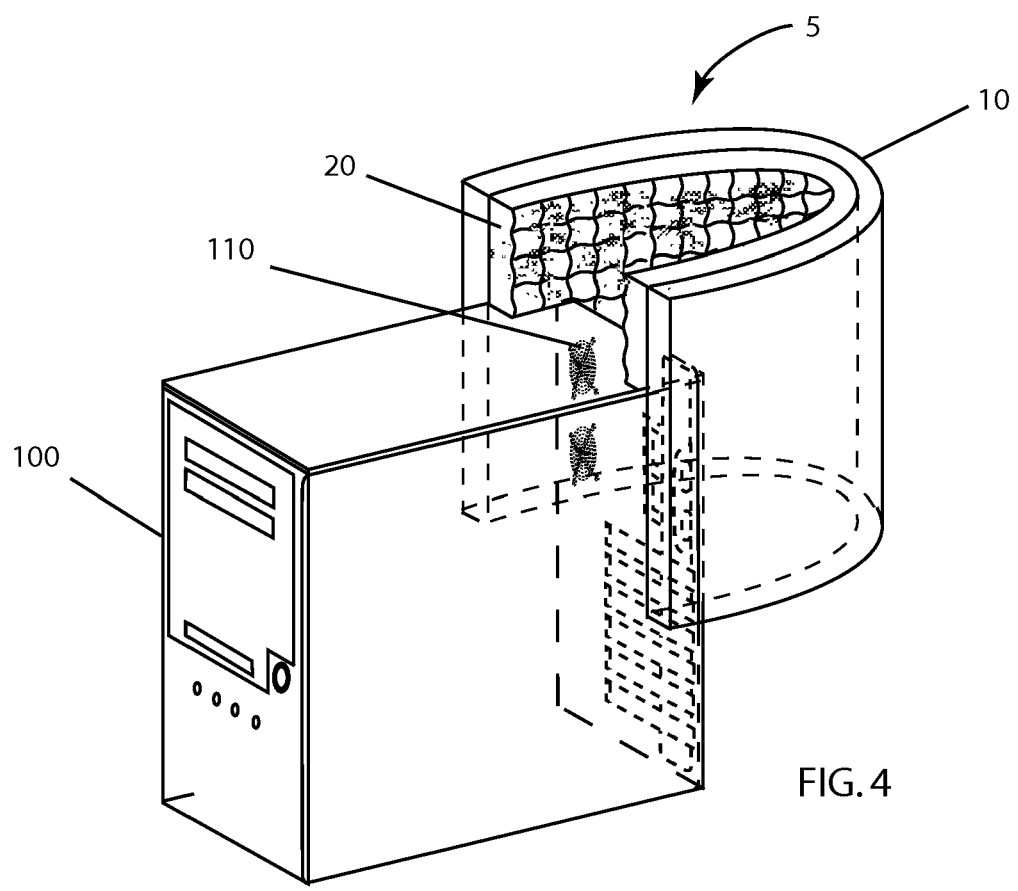
FIG. 4 shows an isometric view of the device as it is assembled onto a computer illustrating a semi-circular structure, according to another embodiment.

FIG. 4—Cantilevered Vertical Semi-Tube ANR Device

FIG. 4 shows a configuration of device 5 as a semicircular shape attached to the sides and cantilevers over the back. It extends higher than the top of PC 100. The top and bottom of the device are open for airflow. This embodiment does not cover the sides of the PC. The device is made of all flexible materials or substantially all flexible materials to be bent to a shape by the user. This configuration is attached to the PC from the top and sides and sits off the ground.

Figure 5:
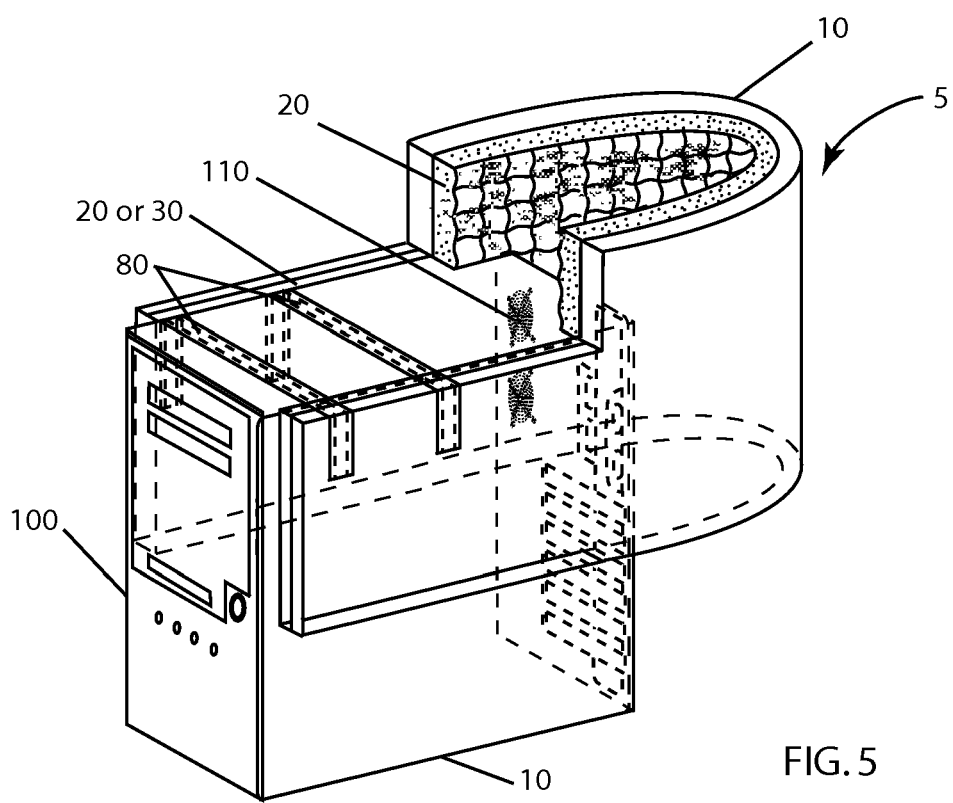
FIG. 5 shows an isometric view of the device as it is assembled onto a computer illustrating a semi-circular structure and extending along the sides of the computer, according to another embodiment.

FIG. 5—Cantilevered Vertical Semi-Tube with Side Covering ANR Device

FIG. 5 shows a configuration of device 5 similar to the one in FIG. 4. Here the sides of PC 100 are covered with either sound or vibration absorber 20 or 30 for more acoustic reduction. The device is made of all flexible materials or substantially all flexible materials to be bent to shape by the user. This configuration is attached to the PC from the top and sides and sits off the ground.

Figure 6:
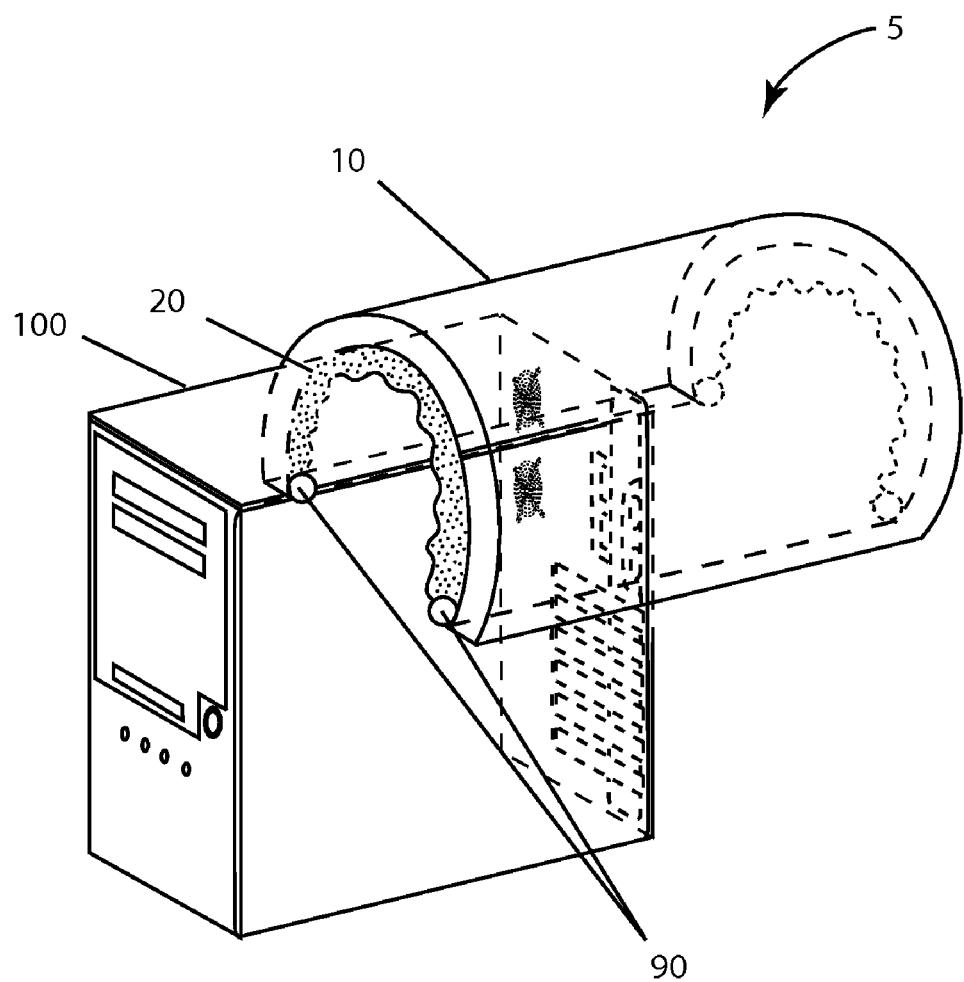
FIG. 6 shows an isometric view of the device as it is assembled onto a computer illustrating a semi-circular structure according to another embodiment.

FIG. 6—Friction-Attached Horizontal Cantilevered Semi-Tube ANR Device

In FIG. 6, high-friction, vibration-absorption material 90 is fixed to the inside bottom of the sheet metal and it holds the device onto the PC by interference fit and friction. Material 90 is attached by bonding, double sided tape, or sheet metal bending. This configuration is manufactured of a flexible hard material for reflector 10. Examples of such flexible hard materials are steel or plastic. The device is configured as one piece that will wrap around the PC for an interference fit. The ends will be composed of high-friction, vibration-absorption material 90 with a friction fir to help hold the device onto the PC. Material 90 is flexible enough to fit different standard widths but yet has enough force caused by the interference fit and friction to hold it to the PC and preferably without any other type of attachment devices. Absorber 20 is on the inside of this device. This configuration is attached to the PC from the top and sides and sits off the ground.

Figure 7A:
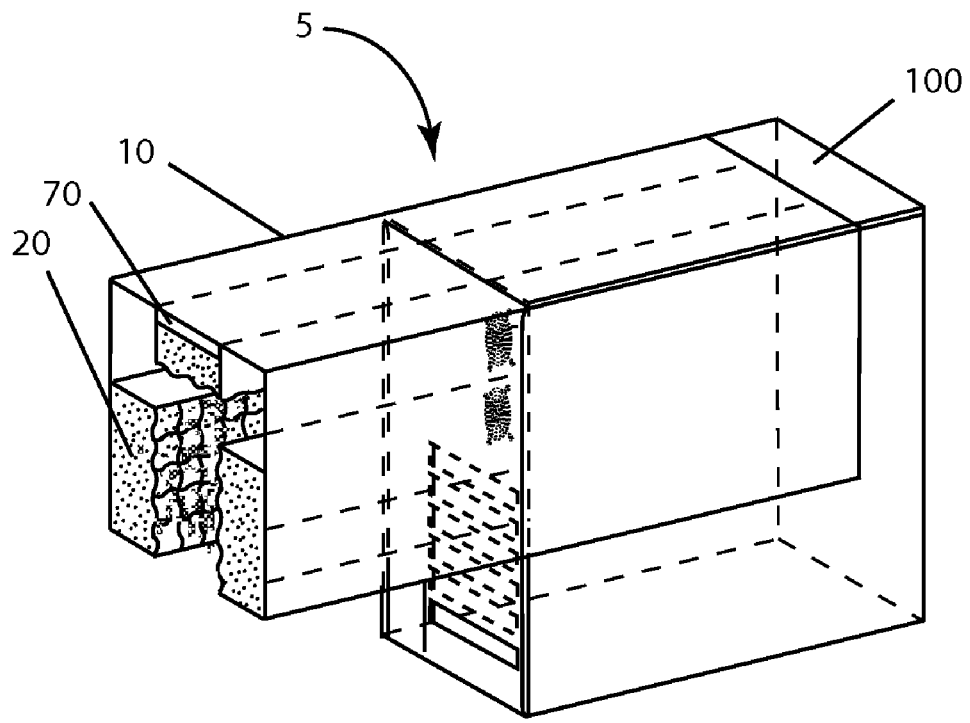
FIG. 7a shows an isometric view of the device as it is assembled onto a computer according to another embodiment.
Figure 7B:
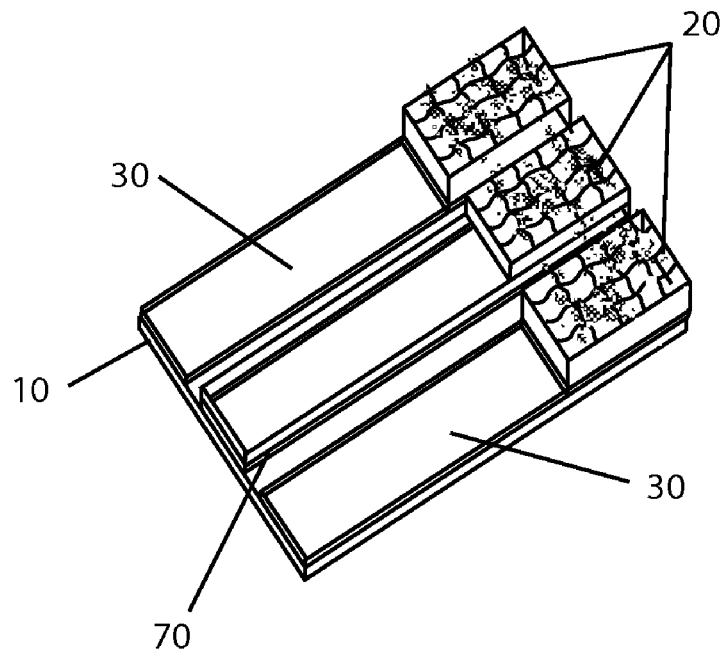
FIG. 7b shows the device of FIG. 7a fully opened, according to another embodiment.

FIGS. 7a and 7b—Flexible Side and Cantilevered Upside Down U-Shaped ANR Device FIG. 7a shows an embodiment of device 5 engaged with PC 100. Here the device covers the majority of the sides and extends (cantilevers over) beyond the back of the PC. This configuration has a cross-sectional shape of an upside-down U. This embodiment shows three panels of reflector or barrier 10 which may be integrally a part of the barrier or connected to each other by attachments means. This configuration is made of all flexible material for adjusting to different PC widths and also for folding for cheaper shipping costs. An acoustic noise reduction material is provided on the inside of the device in the section beyond the back. There may either be vibration reduction or acoustic noise reduction between the sides of the PC and the device. This configuration is attached to the PC from the top and sides and sits off the ground.

FIG. 7b illustrates the device unfolded and lying flat on its outside, with the inner surface exposed. Sections of the device are made of a flexible material to bend around the edges of the PC or device. In one embodiment, reflector 10 is made of a flexible material such as rubber.

In another embodiment, only the sections which need to bend are made of a flexible material. These sections of flexible material are shown between the segments with vibration absorber 30. Material 70 provides structural strength and helps maintain the shape of the flexible device. Material 70 is placed on the top area of the PC and is affixed to the PC. It holds the weight and maintains the shape of the back cantilevered end of the device, behind the fans.

FIGS. 8 and 9—Horizontal Floor Standing ANR Device

FIG. 8 shows a configuration of device 5 similar to the configuration in FIG. 3 and illustrates how device 5 sits on the floor. Device 5 has a slot at the bottom for cables and is made of two separate L-shaped pieces of reflector 10, making it adjustable for PCs of different widths.

FIG. 9 shows the cross section of device 5 and the acoustic absorption material as well as the acoustic reflecting material on its outside. These materials overlap so that they can be adjusted for PCs of different widths.

FIG. 10—Vertical Floor Standing ANR Device

FIG. 10 shows a configuration of a device which is similar to the one of FIG. 2. The device is turned 90 degrees and sits on its end on the same surface on which that PC 100 sits. The device has a sloped back and a slot at the bottom for cable outlet. Although not shown to be adjustable, the device can be made from two pieces of reflector 10 and made adjustable as in the device of FIG. 8.

Figure 11A:
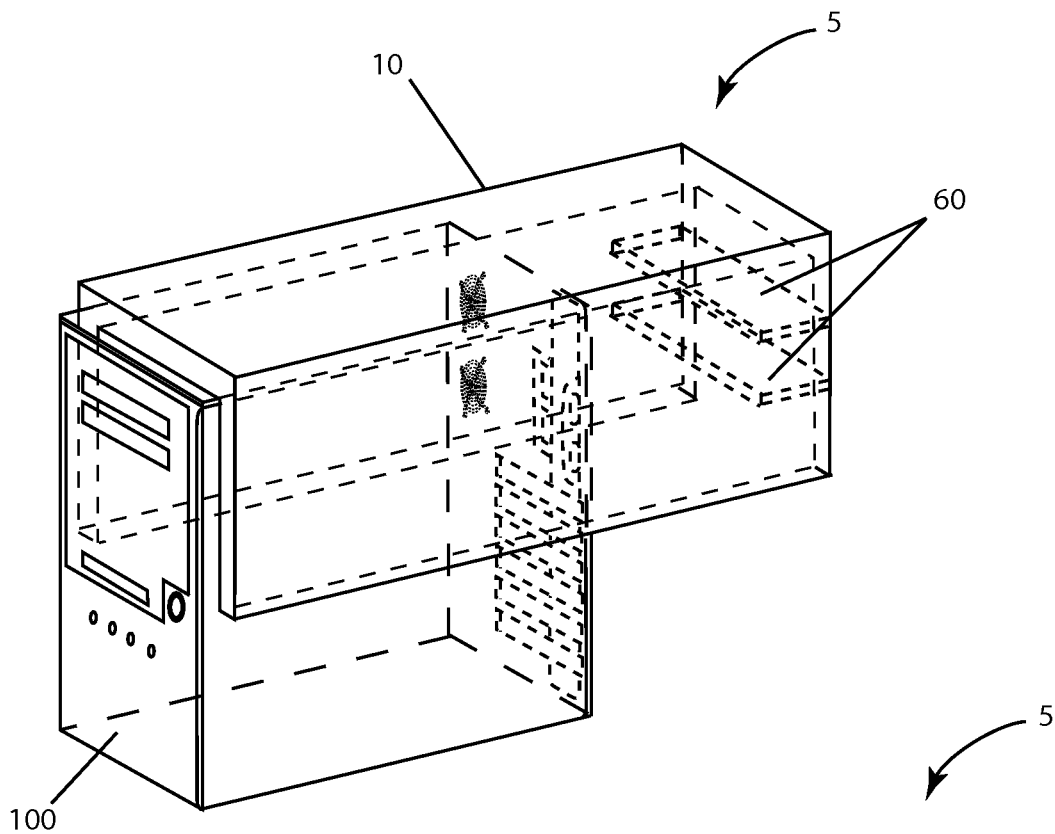
FIG. 11a shows an isometric view of the device assembled onto a computer, illustrating noise absorbing plates, according to another embodiment.
Figure 11B:
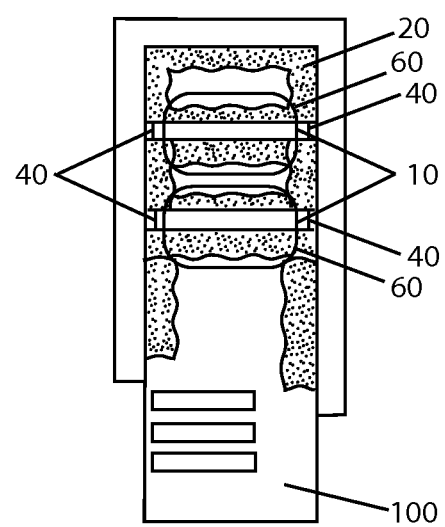

FIGS. 11a and 11b—Side And Cantilevered Upside Down U-Shaped ANR Device with Horizontal Baffles FIG. 11a shows a configuration of a device 5 similar to the one in FIG. 2. The device has two added horizontal acoustic absorption plates 60 placed in the back. These plates further enhance the acoustic absorption of the device. In FIG. 11b, acoustic absorbing material plates 60 comprise absorber 20 located in a horizontal position in the back of the device. Plates 60 may or may not have reflector 10 incorporated. Plates 60 are fixed to the vertical sides of the device by either use of a h&l fastener 40, sewing, bonding onto the sides, or other equivalent attachment means.

Figure 12A:
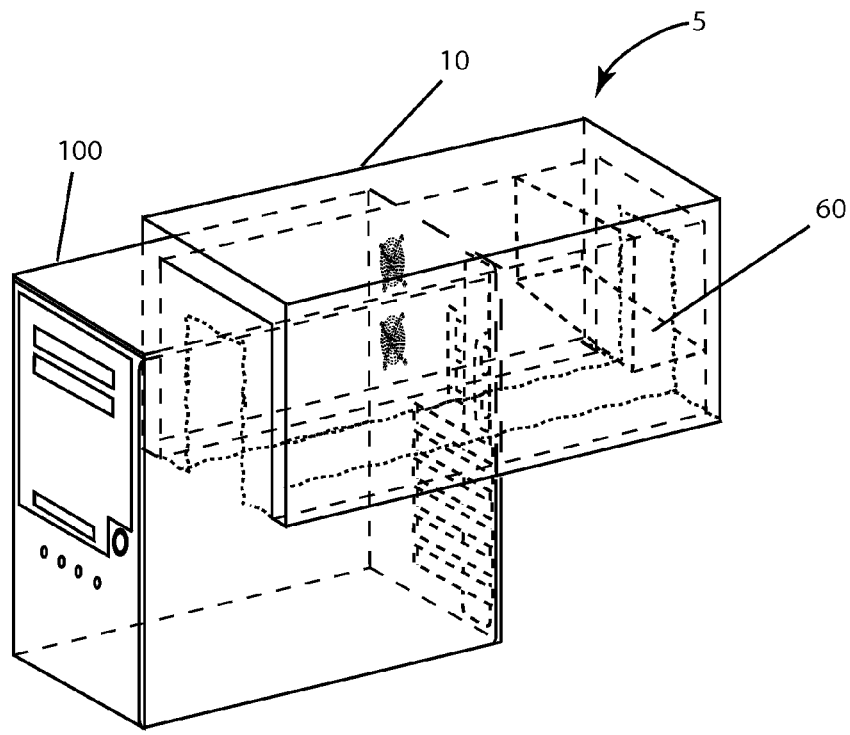
FIG. 12a shows an isometric view the device assembled onto a computer, illustrating a reflector partially covering the end opening of the device, according to another embodiment.
Figure 12B:
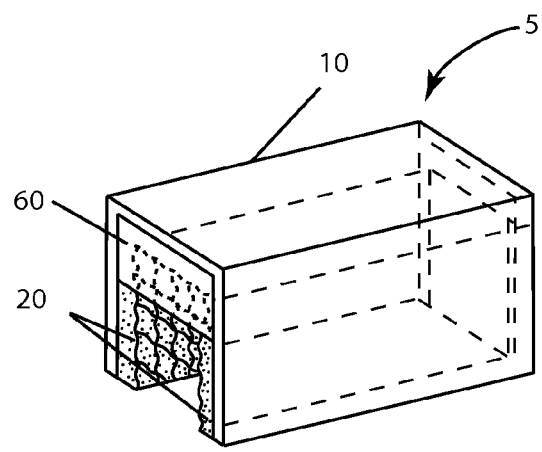

FIG. 12a and 12b—Side Cantilevered Upside Down U-Shape ANR Device with Vertical Baffle FIG. 12a shows a device similar to the one in FIG. 2. It comprises an added vertical acoustic absorption plate 60 placed at the end opening of the device. The plate may be attached by means described above in relation to the plates 60 in FIG. 11a, or can be made integral to reflector 10.

FIG. 12b shows an isometric view of the device with absorber 20 and also vertical plate 60 placed at the end of the device.

Figure 13:
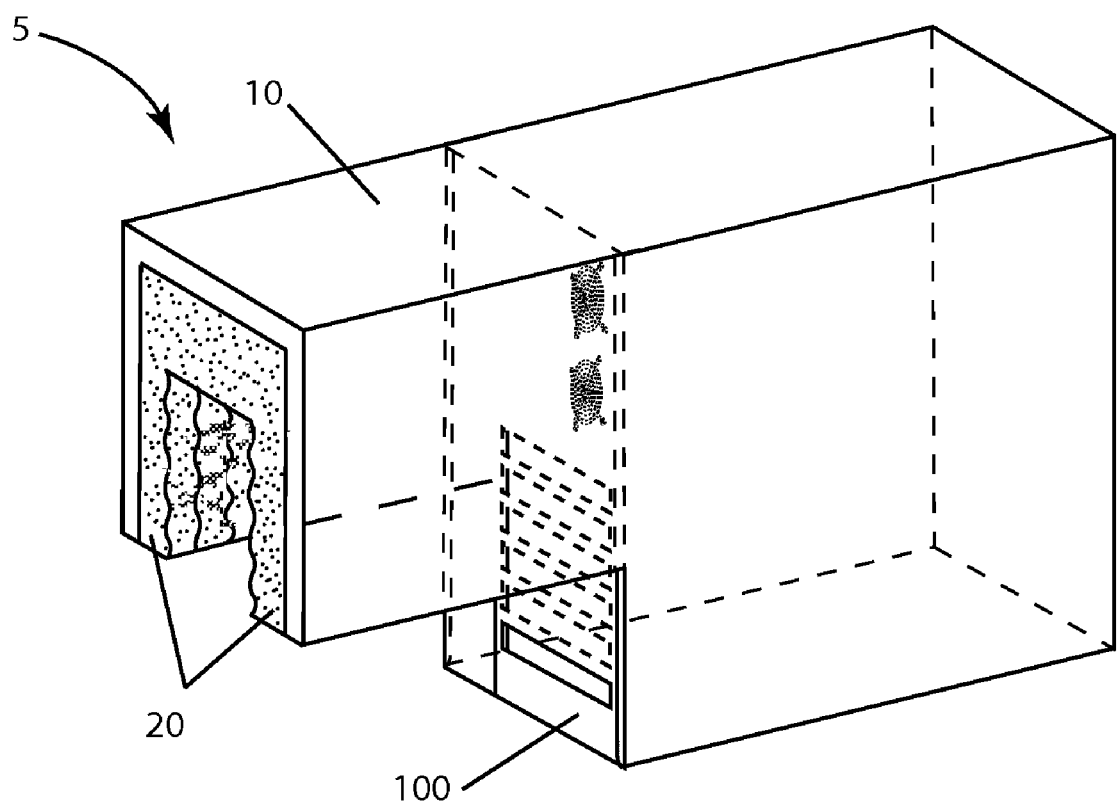
FIG. 13 shows an isometric view of the device made integral to a computer, according to another embodiment.

FIG. 13—Integrated ANR Device

FIG. 13 shows a configuration of a device similar to the one in FIG. 3. The device is built into the sheet metal of the chassis of PC 100. Absorber 20 is placed on the inside of the device.

Figure 14A:
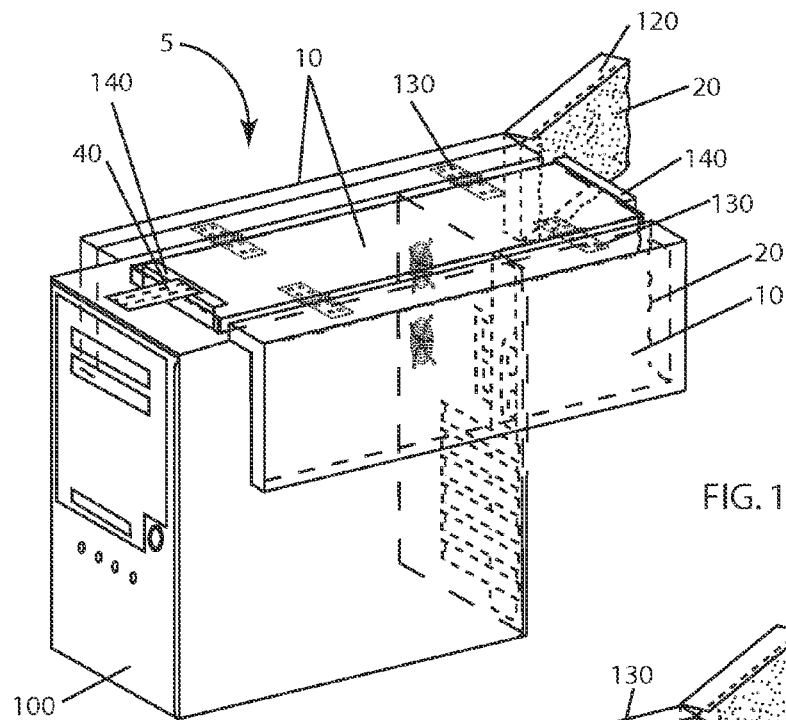
FIG. 14a shows an isometric view of a configuration of the device as it is assembled onto a computer, according to another embodiment.
Figure 14B:
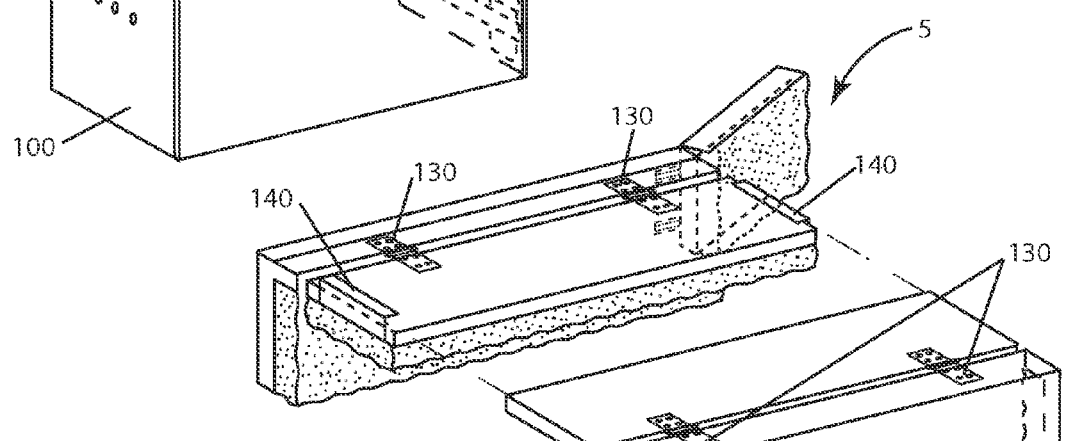
Figure 14C:
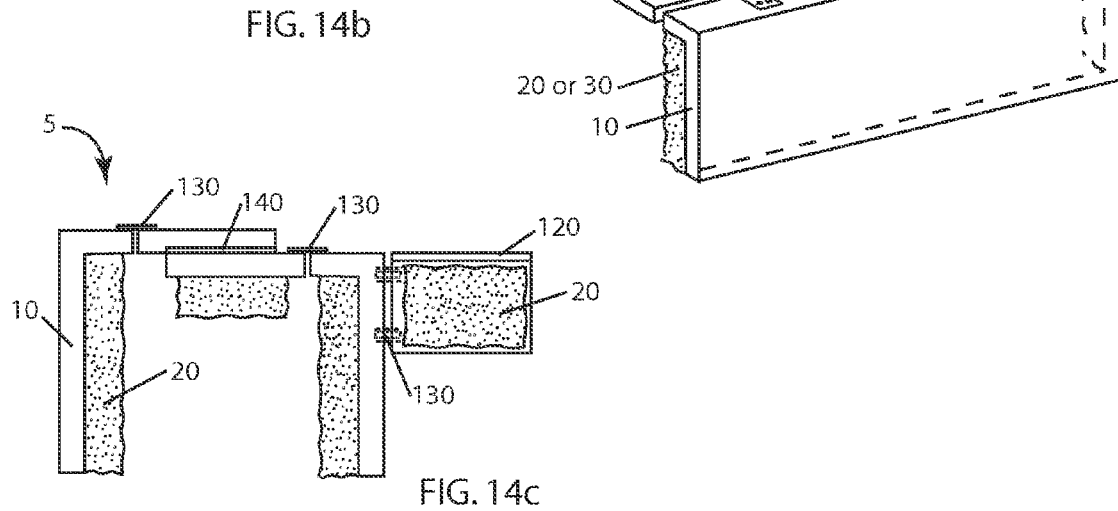

FIGS. 14a-14c—Cantilevered ANR U-Shaped Device with One Door

FIG. 14a shows a device which covers some of the sides of PC 100 and extends or cantilevers out beyond the back of the PC. This configuration has a cross-sectional shape of an upside-down U. Absorber 20 is positioned on the inside of the device in the section beyond the back of PC 100. Either vibration absorber 30 or absorber 20, as shown in FIG. 14b, may be positioned between the sides of PC 100 and reflector 10. Device 5 is attached to the PC from the top and both sides and sits off the ground. Device 5 has the following features:
  1) It can be adjusted for different widths of personal computer chassis as the device slides through slide or guide rails 140 as shown in FIG. 14b where barriers 10 are adjustable for fitting atop a personal computer chassis;
  2) It can be made collapsible by hinges 130 for compact storage and shipping;
  3) It has a door 120 which provides further acoustic reduction and which may be opened or closed during use, as shown in FIG. 14c.

Device 5 may be assembled using components made of plastic, acrylic, combinations thereof, or other suitable material along with an adhesive to attach the different components. These components include hinges 130, the sides, the top, rails 140, and back door 120. The components may also be manufactured using injection molded or thermoformed plastic. Absorber 20 may be attached using double-sided tape, special adhesive, or absorber 20 may be manufactured with double-sided adhesive already attached. As shown in the back view of device 5 of FIG. 14c, door 120 may include absorber 20 on the inside surface of door 120. The device may be attached to the personal computer chassis using h&l fastener 40 or other similar attachment means as shown in FIG. 14a.

Figure 15A:
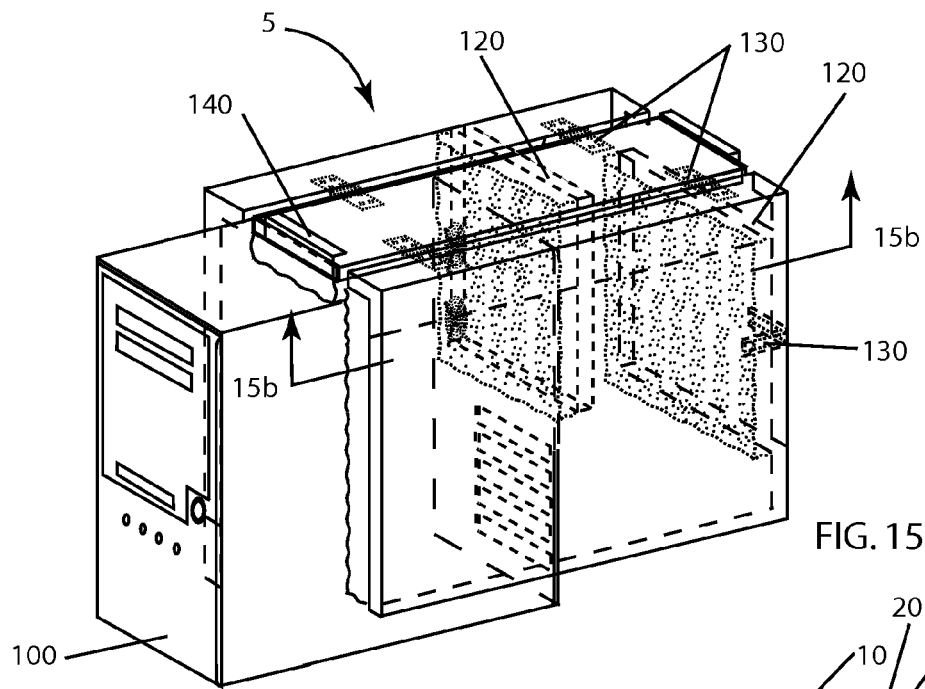
FIG. 15a shows an isometric view of the device as it is assembled onto a computer according to another embodiment.
Figure 15B:
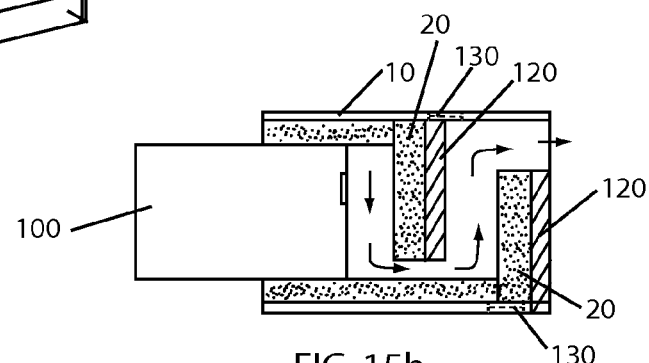
FIG. 15b shows a partial top cross-sectional view of the device of FIG. 15a, taken at the 15b-15b line.
Figure 15C:
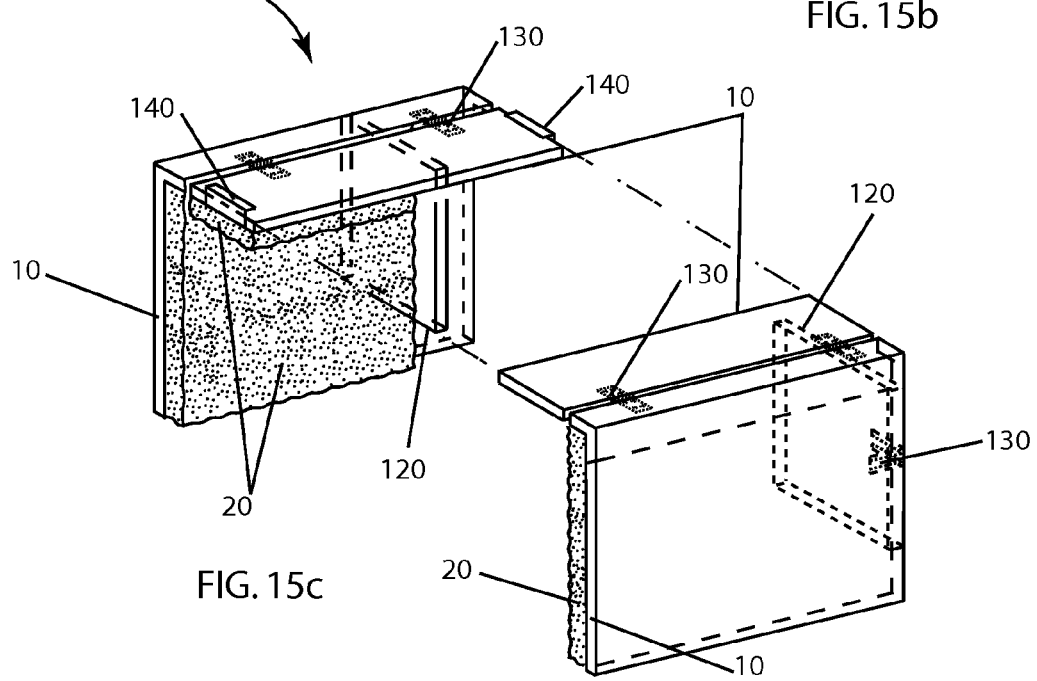

FIGS. 15a-15c—Cantilevered U-Shaped ANR Device with Two Doors

FIG. 15a shows a device which is similar to the one of FIG. 14a with the exception of the configuration of back doors 120. Device 5 has two or more overlapping doors 120 but with a gap between the doors for an air passage from fans 110, as shown in the top cross-sectional view of FIG. 15b. Doors 120 pivot on hinges 130 and facilitate the reduction of acoustic noise. Doors 120 may have absorber 20 on the surfaces facing the fans. Doors 120 may be positioned as shown or moved to hang on the opposite sides such that the airflow path is first straight out then turns in the right hand direction thereby leaving a larger space from the fans to the outermost door 120. This device is adjustable for different personal computer widths and is also collapsible. FIG. 15c shows reflector 10 are made adjustable along slide rails 140 and collapsible by hinges 130 as shown. Doors 120 can bend all the way back (270°) to become flush and parallel to the side walls of reflector 10. The top parts or top panels of reflector 10 are hinged at 130 to the side parts of reflector 10 and slide over one another at the top. They are also bendable 90° downward when collapsed for disassembly, allowing ease of storage or shipping at lower costs.

Figure 16A:
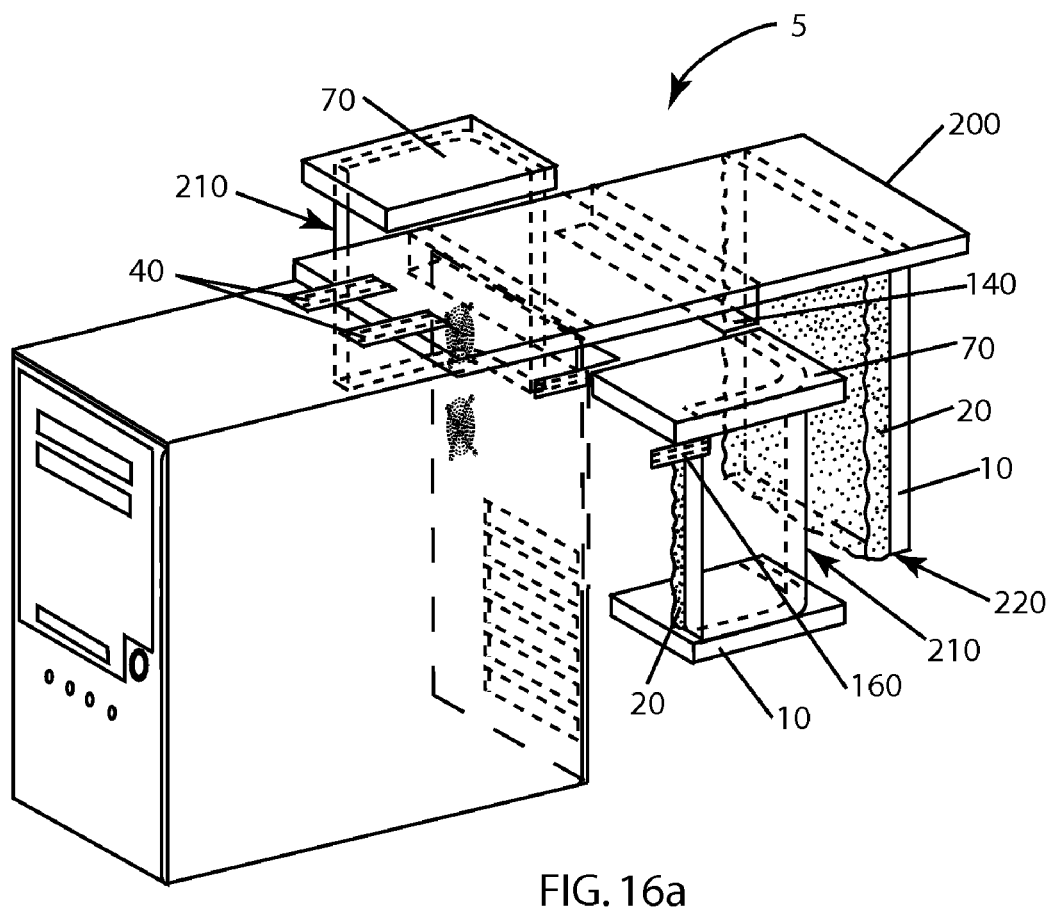
FIG. 16a shows an isometric view of the device as it is assembled onto a computer, illustrating a slide rail structure, according to another embodiment.
Figure 16B:
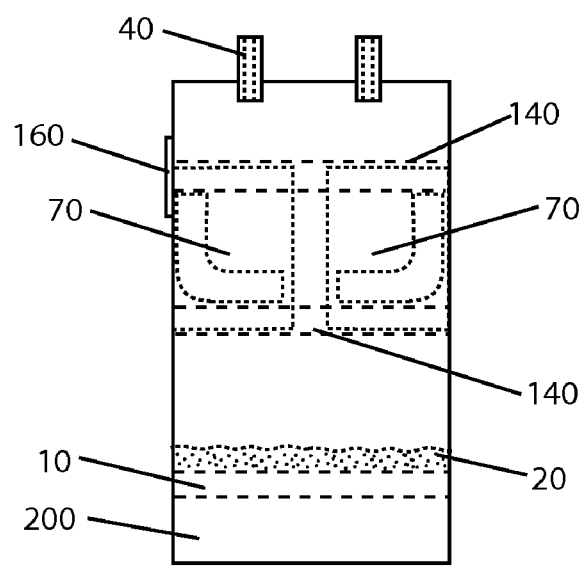

FIGS. 16a-16b—Two-Sided Slide-Rail-Adjustable ANR Device

FIGS. 16a and 16b show a device 5 which is adjustable in width from both sides. Two acoustic barriers 10 are placed on slide rails 140 and slide to the outside for width adjustment. These two barriers comprise slides at the top surface of a hard base material 70 connected to barrier 10, which hang on slide rails 140 on the inside surface of top cantilevered piece 200. Material 70 may be made of plastic or any other solid material. The two barriers 10 comprise flexible composite side pieces 210. Air escapes through the gap between the two flexible side pieces 210 which curve. Flexible piece 210 is a composite of flexible barrier 10 and absorber 20. Back piece 220 serves to further absorb acoustic noise coming out of the gap and comprises a composite of reflector 10 and absorber 20. Pieces 210 and 220 are a combination of the acoustic noise barriers and the acoustic absorption materials. A variation of this embodiment may incorporate the sliding mechanism and overlapping barriers as described in FIG. 14 above.

Figure 17A:
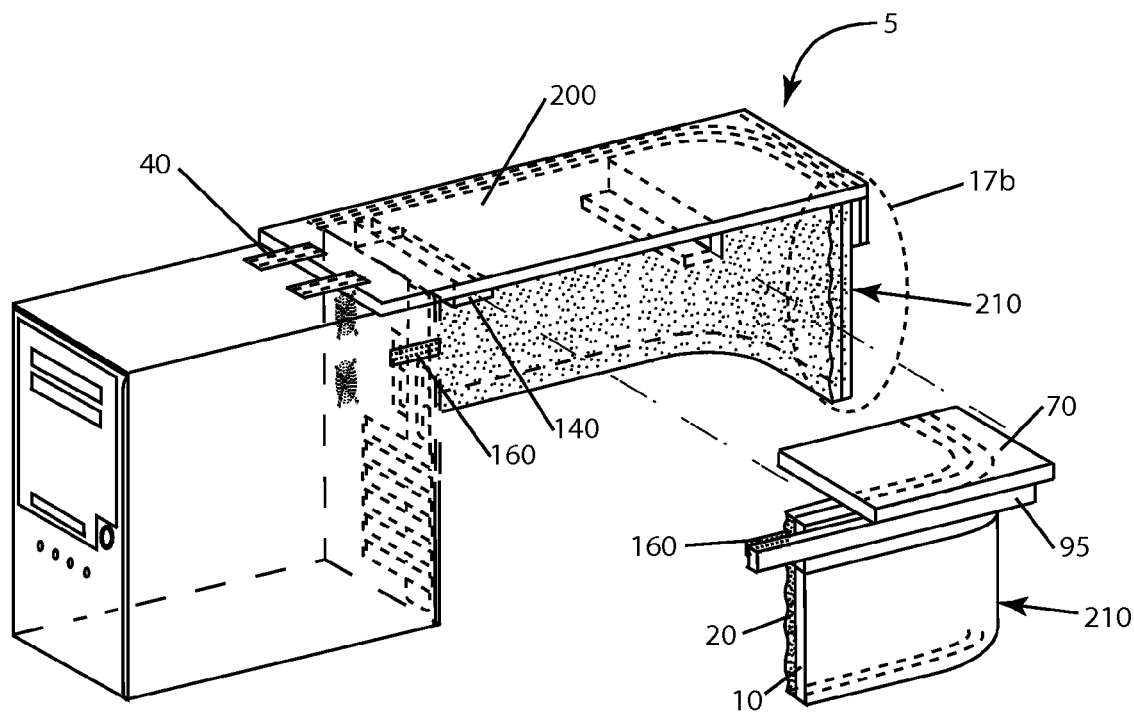
FIG. 17a shows an isometric exploded view of the device as it is assembled onto a computer, illustrating a slide rail structure, according to another embodiment.
Figure 17C:
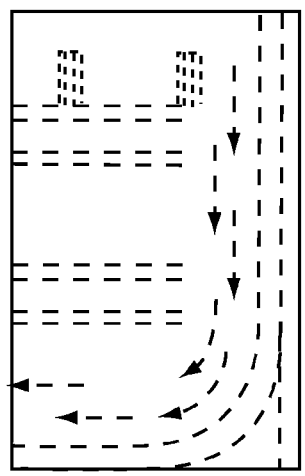
FIG. 17c shows a top view of the device of FIG. 17a, through the cantilevered piece.
Figure 17B:
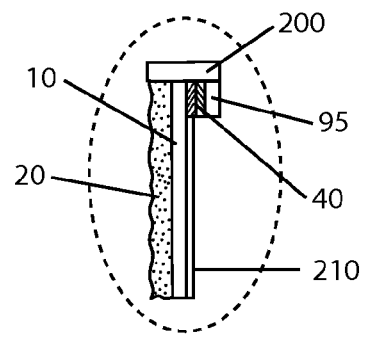

FIGS. 17a-17c—One Side Slide-Rail Adjustable ANR Device

FIG. 17a shows a device 5 which is adjustable in width in a similar fashion to the device of FIG. 16a. In this device one side of the acoustic barrier slides while the other side stays fixed. Hard slide material 70 slides on slide rails 140. Cantilevered panel 200 is attached to the personal computer using a h&l fastener 40. It is further positioned in place by two side solid wall panels 95. Each of walls is approximately a 2.5 cm (one inch) high solid panel 95 which stretches along the bottom outer edge of panel 200 and along the upper outer edge of a flexible panel 210. Wall 95 stretches beyond slide panel 70 and panel 200 to further position this device. Panel 95 is attached to the side of the PC by an attachment means such as a h&l fastener 160. Reflector 10 and absorber 20 are attached to panel 95 using h&l fastener 40, shown in FIG. 17*b*. Reflector 10 and absorber 20 may extend downward for more than 30.5 cm (12 inches). In this configuration, reflector 10 and absorber 20 may come as a single flexible composite panel 210. A variation of this embodiment may incorporate the sliding mechanism and overlapping barriers as described in FIG. 14.

FIG. 17*b* is the view taken from FIG. 17*a* showing the detail of panel 210 with panels 95 and 200. The connection is made by h&l fastener 40. Panel 210 comprises reflector 10 and absorber 20. FIG. 17*c* shows a partial top view of the device of FIG. 17*a*, through the cantilevered panel and illustrates the positions of the adjustable acoustic barriers and the path of airflow.

Figure 18:
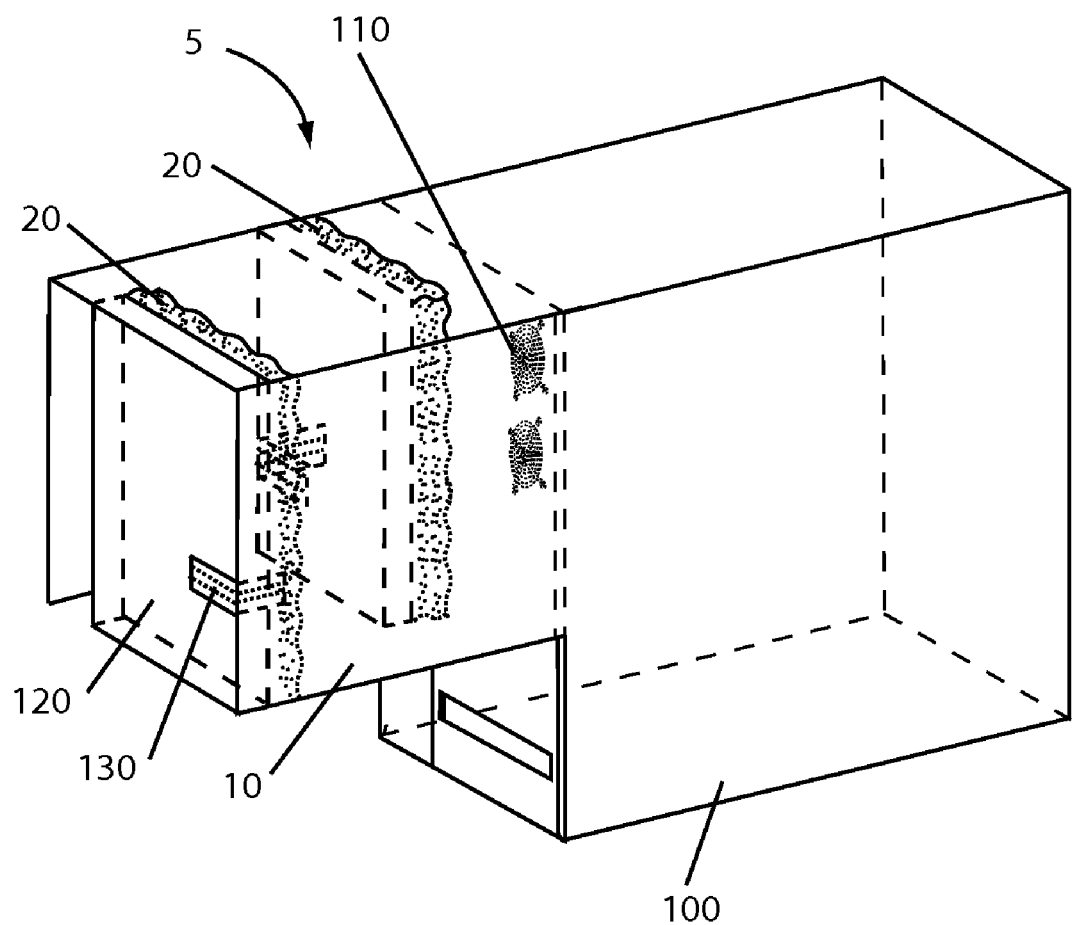
FIG. 18 shows an isometric view of the device made integral to a computer, according to another embodiment.

FIG. 18—Two-Door Integrated ANR Device

FIG. 18 shows a device 5 configured as an integral part of personal computer chassis 100. The walls of device 5 comprise reflectors 10. The insides of reflectors 10 are lined with absorber 20. These walls may not extend all the way to the floor as far as the rest of the chassis. At the end of one of these walls is a first door 120 on hinges 130 with absorber 20 on the inside of this door. Also a second door 120 is mounted on the other side, closer to fans 110 than first door 120, which also has acoustic noise absorber 20 on the inside. Doors 120 allow air to pass between them. Also a gap may be provided between doors 120.

Figure 19A:
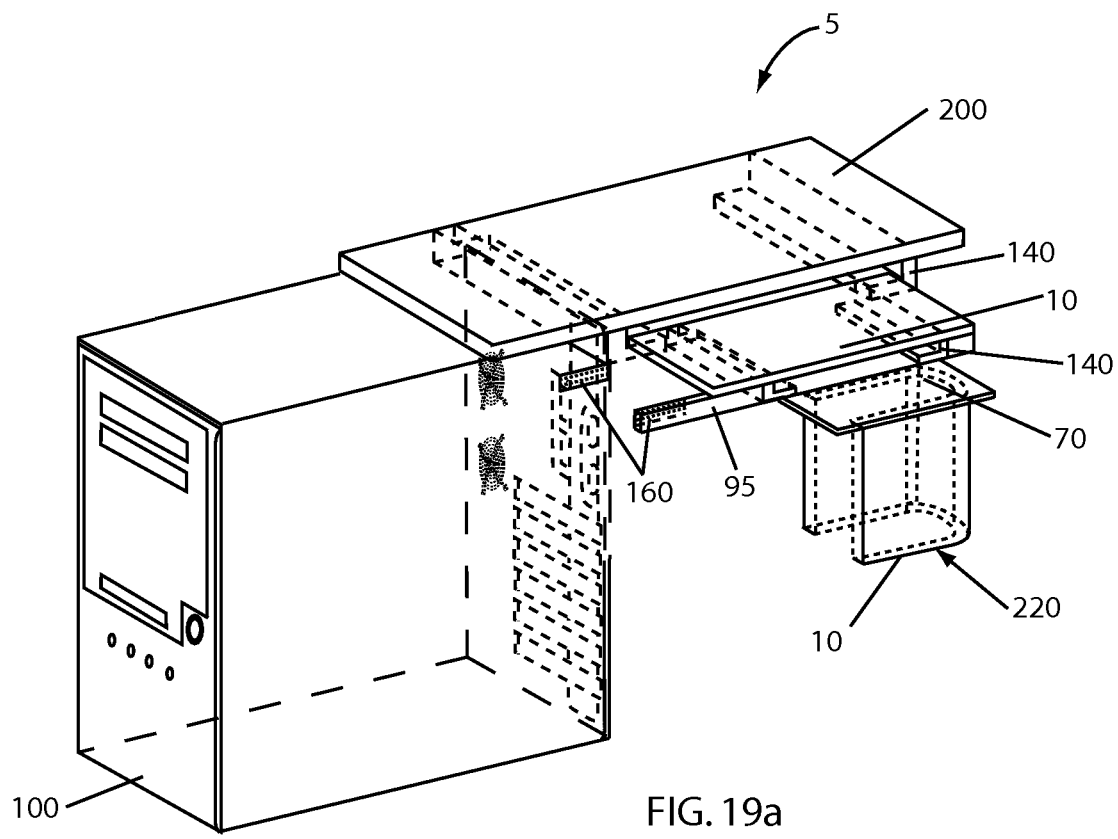
FIG. 19a shows an isometric view of the device as it is assembled onto a computer according to another embodiment.
Figure 19B:
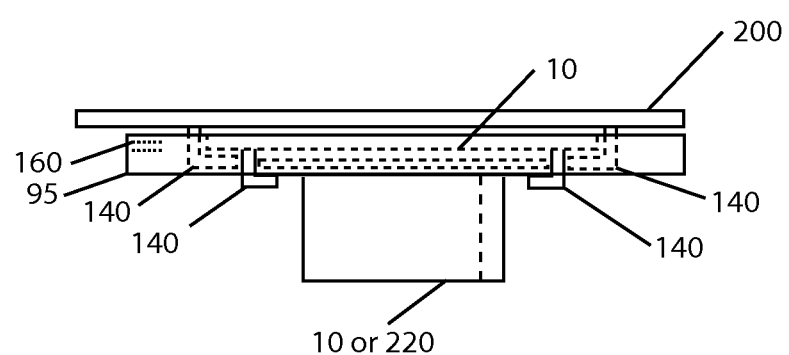

FIGS. 19*a*-19*b*—Bottom Air Outlet ANR Device

FIG. 19*a* shows a device 5 which comprises a cantilevered solid panel 200 that sits on top of PC 100. It is similar to the device of FIG. 17. The device does not cover the connectors of the PC but is adjusted to focus on the fan side. Acoustic barrier 10 is adjustable to fit different sized personal computers and it is also adjustable to locate the best position next to the fan location for the inner side of acoustic barrier/absorption material composite panel 220. Side panel h&l fastener 160 may be used to engage wall 95 of first barrier 10 against the PC sides. Reflector 10 slides along a first set of slide rails 140 which are connected to the underside of cantilevered panel 200. Below first reflector 10 is second reflector 10 of composite panel 220 extending vertically downward and having a hard material 70 at the top surface. Second reflector 10 is adjustable along a second set of slide rails 140 connected to the underside of first reflector 10. By sliding hard material 70 into the second set of slide rails 140, second reflector 10 is adjusted to the position of the fans.

FIG. 19*b* is a side view of the device and shows the configuration of reflectors 10. An air gap between cantilevered panel 200 and first reflector 10 is provided for airflow. Reflectors 10 may comprise composite 220 or a flexible composite piece.

Figure 20A:
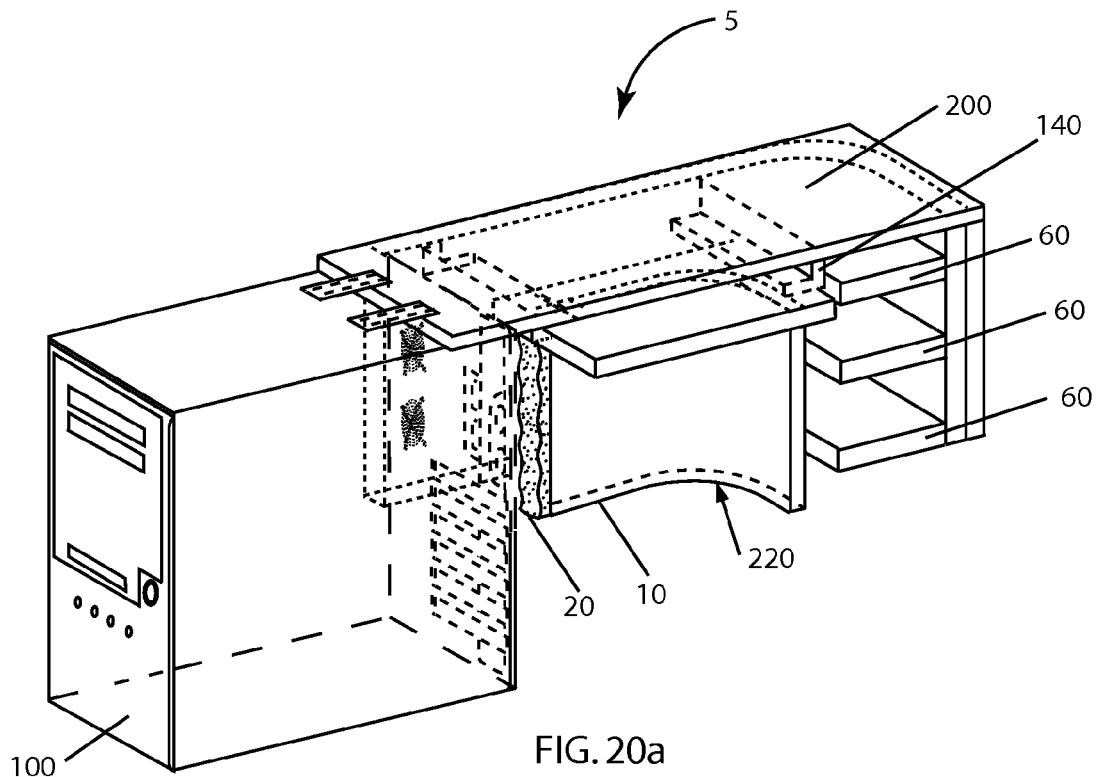
FIG. 20a shows an isometric view of the device as it is assembled onto a computer according to another embodiment.
Figure 20B:
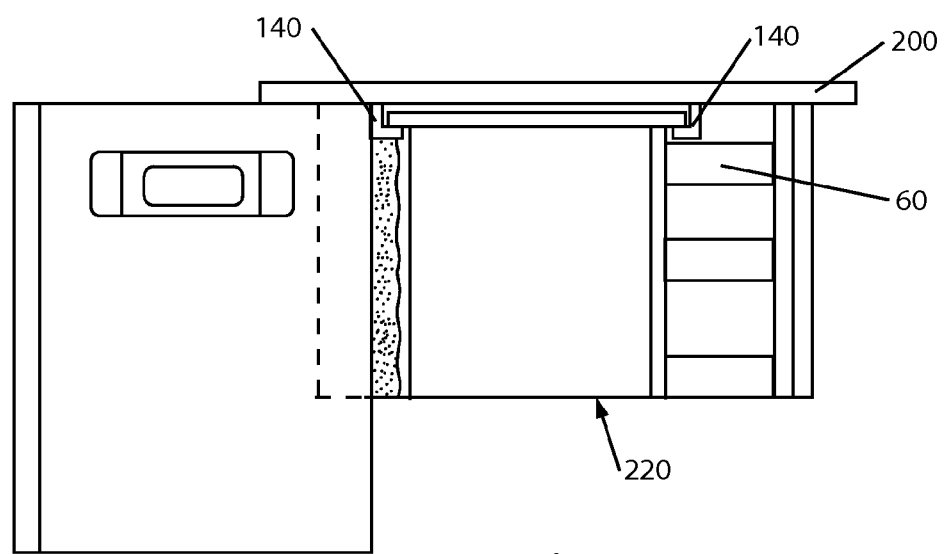

FIGS. 20*a*-20*b*—One-Side Slide-Rail Adjustable ANR Device with Baffles FIG. 20*a* illustrates an embodiment of device 5 which focuses on the fans but not the connector area of PC 100. This embodiment is similar to the device of FIG. 19 and FIG. 17. The device is adjustable for different PC widths and it is able to adjust for a best location of the inner acoustic noise barrier and absorption material composite panel 220. The device works by taking the airflow on a 90° laminar air flow turn for minimum airflow loss. Depending upon the configuration, the airflow may turn in other directions such as down or up. This reduces the air noise because there is no single line for the noise to leave the device, except at the bottom. At the exhaust section at the far end are one or more acoustic baffles 60 to further reduce the noise. Baffles 60 are made of absorber 20 or composite panel 220 of reflector 10 and absorber 20. FIG. 20*b* illustrates a side view of the device. Reflector 10 of panel 220 is slidably engaged with cantilevered panel 200 by slide rails 140 to adjust to the location of the fans.

Figure 21A:
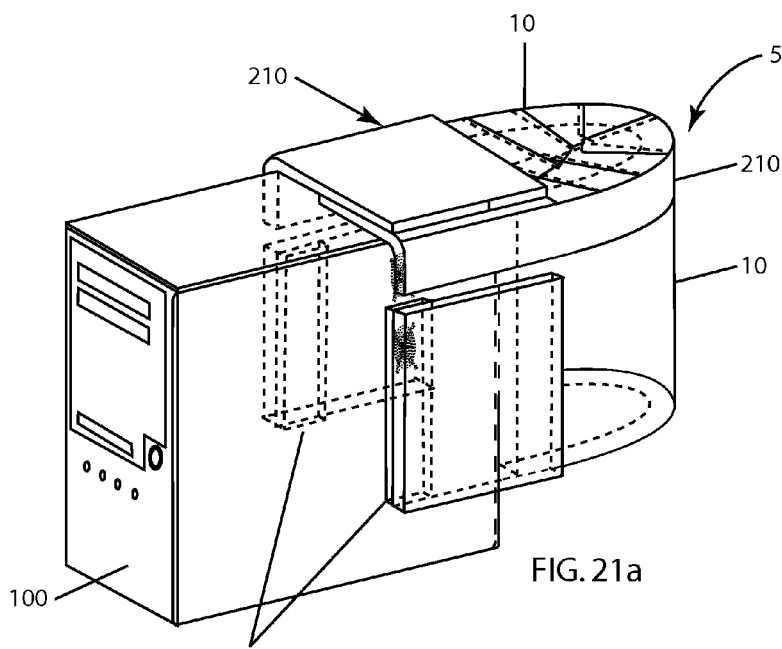
FIG. 21a shows an isometric view of the device as it is assembled onto a computer according to another embodiment.
Figure 21C:
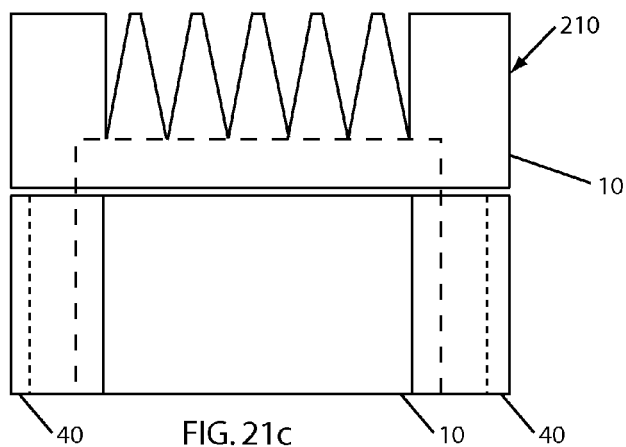
FIG. 21c shows a front view of the device of FIG. 20a with the device open and extended.
Figure 21B:
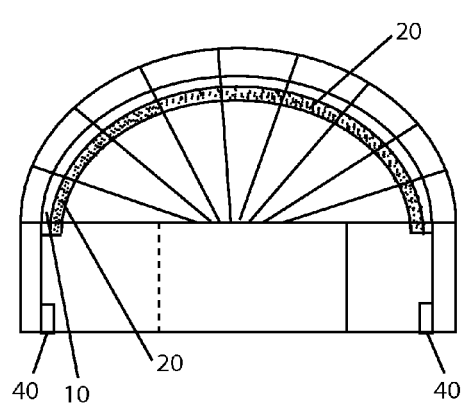
FIG. 21b shows a top view of the device of FIG. 20b.
Figure 21D:
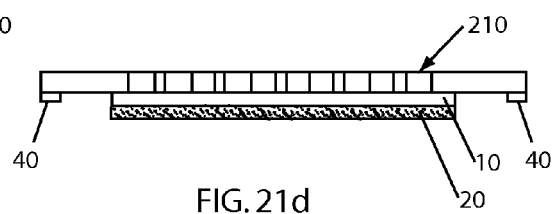
FIG. 21d shows a partial top view of the device in FIG. 21c with the device open and extended.

FIGS. 21*a*-21*d*—Top Covered Flexible Cantilevered Vertical Semi-Tube ANR Device FIG. 21*a* shows an embodiment of the device made of a flexible material and is similar to the device of FIG. 4. A flexible cover 210 and the sides are made of a solid material for a small portion of both ends. These solid ends are used to hold the device to the rear sides of PC 100 using an attachment means such as h&l fastener 40. Flexible cover 210 comprises mostly flexible material which can be shaped to fit a personal computer of almost any width. Cover 210 includes fold-over parts, flaps, or tabs, shown in FIGS. 21*b*, 21*c*, and 21*d*. These may be used to cover the top area behind the PC to reduce acoustic noise. The fold-over parts comprise reflector 10 and may have some acoustic absorption material on the inside surface. The fold-over pieces have many sections to allow this device to fit over personal computers of different widths and still cover the top without leaving any openings. The flexibility of the device allows it to be wrapped around itself or folded for reduced cost of shipment, delivery, and storage. FIG. 21*b* shows the device from a top view with the fold-over pieces folded over. FIG. 21*c* is a front view of the device in an open position with the pieces of cover 210 extended upward. FIG. 21*d* is a top view of part of the device of FIG. 21*c*; it shows the top view of the pieces of cover 210 extended, and further shows reflector 10 and absorber 20 attached to the inner surface.

Figure 22A:
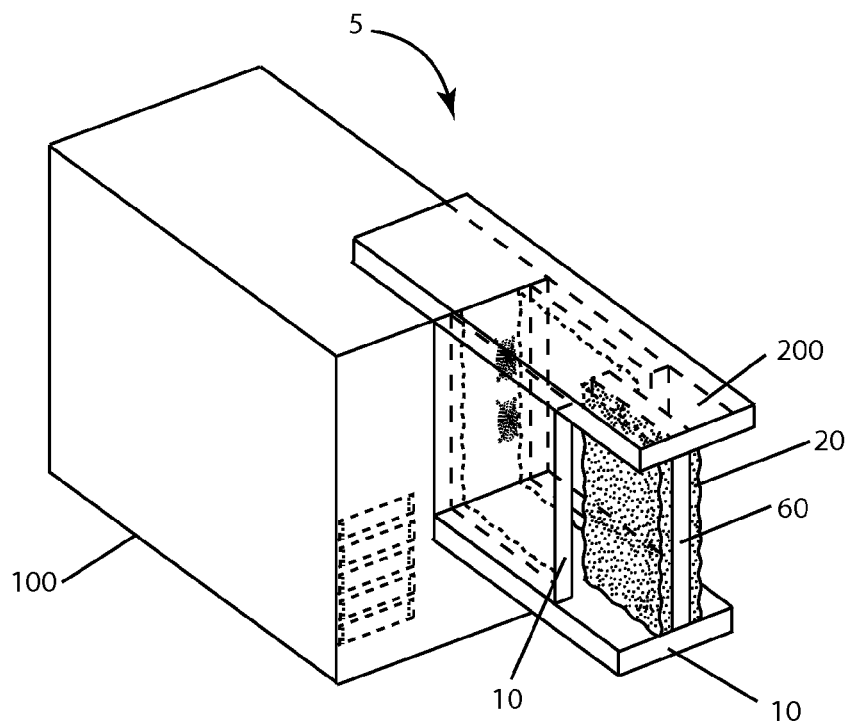
FIG. 22a shows an isometric view of the device as it is assembled onto a computer according to another embodiment.
Figure 22B:
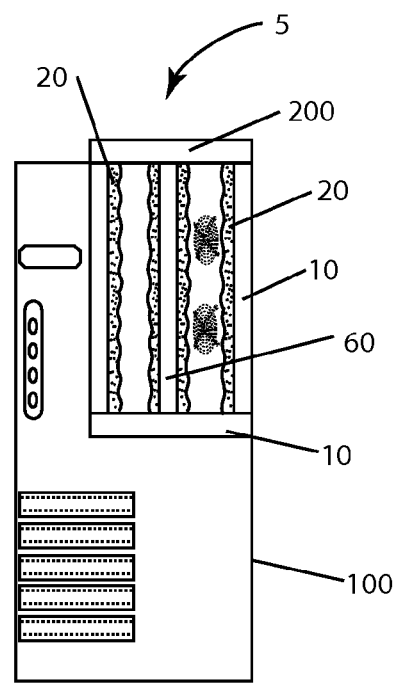

FIGS. 22*a*-22*b*—Rectangle Tube with Baffles

FIG. 22*a* illustrates an embodiment of device 5 which focuses on the area of the fans. Acoustic side wall reflectors 10 also include absorber 20, FIG. 22*b*. The device comprises one or more baffles or baffling partitions 60 between side reflectors 10 for reducing acoustic noise. Baffles 60 are placed vertically and have absorber 20 on their surfaces. Baffles may also be placed horizontally or at other angles or in any type of grid shape. Other examples of configurations for the baffles may be in the form of square, honeycomb, triangular, vertical, horizontal, or any combination thereof. FIG. 22*b* is a back view of device 5 engaged on PC 100 and illustrates absorber 20 on side wall reflector 10 and baffle 60.

RAMIFICATIONS AND SCOPE

While the description and drawings show exemplary embodiments with specific configurations, those of ordinary skill in the art will recognize that these embodiments can be realized in other specific forms. Thus the description and the drawings should be considered illustrative and not limiting. Many variations are possible and those of ordinary skill will be able to practice such other embodiments without undue experimentation. E.g., any of the embodiments described may have small breather air release openings with baffles to reduce the acoustic noise escaping from the openings. In addition, such baffles may comprise a box baffle structure of small elongated, tube like shaped holes or other shaped openings for further noise absorption. As an example, the ratio of the length to diameter of these elongated holes is greater than three for better absorption.

Thus the scope of the present patent is not limited merely to the specific exemplary embodiments, but rather is indicated by the appended claims and their legal equivalents.

The invention claimed is:

1. An acoustic noise-reduction cover or hood for an electronic device such as a computer that contains (a) an air-outlet side having a fan air outlet and having a width within a predetermined range of sizes and (b) a pair of bordering sides adjacent and bordering opposite sides of said air-outlet side, said acoustic noise-reduction cover or hood comprising:

a sheet of acoustic-reflecting material having a predetermined size, an inside surface, an opposing outside surface, and a plurality of edges, namely a bottom edge, a top edge, and two side edges, the width of said sheet being measured between said side edges, said sheet of acoustic-reflecting material being bendable or foldable and the width of said sheet having a predetermined size so that it can be bent from a flat condition to a U-shaped condition and back so that a pair of opposing edge portions of said sheet can be affixed to said pair of bordering sides of said electronic device and the portion of said sheet between said opposing edges will be bent to extend over said air-outlet side of said electronic device in a spaced relation to said air-outlet side so as to provide a gap between said sheet and said air-outlet side and provide an open area at the top or bottom of said sheet to allow air from said air outlet to exit said air-outlet side and flow past at least one of said bottom or top edges of said sheet, said pair of opposing edge portions of said sheet of acoustic-reflecting material containing means for attaching said edge portions of said sheet to said bordering sides of said electronic device so that said edge portions of said sheet lie flat against said respective bordering sides, said sheet being flexible enough to be stored and shipped in a flat or bent condition and to be bent from a flat condition to a U-shaped condition and attached to bordering sides of electronic devices of a range of sizes so that said cover will be spaced from and not block said air outlet and will have an open area to allow air from said air outlet to escape.

2. The acoustic noise-reduction cover or hood for an electronic device of claim 1, further including a layer of flexible acoustic-absorbing material attached to said inside surface of said sheet of flexible acoustic-reflecting material, thereby to form a composite sheet, said layer of flexible acoustic-absorbing material being free of any acoustic reflecting material covering so that when said composite sheet is attached to said electronic device said layer will face said air-outlet side of said electronic device directly so as to be able to absorb sound from said electronic device, layer of flexible acoustic-absorbing material having a width narrower than the width of said sheet of acoustic-reflecting material so that said edge portions of said sheet of flexible acoustic-reflecting material are free of said acoustic-absorbing material so that said edge portions can be attached readily to said bordering sides of said electronic device.

3. The acoustic noise-reduction cover or hood for an electronic device of claim 1, further including a plurality of flaps or fingers extending from a top edge of said sheet of flexible acoustic-reflecting material, a pair of said flaps or fingers having attachment means thereon so that said flaps of said pair can be attached together or to a top of said electronic device, whereby said flaps or fingers can be positioned to overlap each other and extend over a top of said electronic device to form a top seal for electronic devices of different dimensions.

4. The acoustic noise-reduction cover or hood for an electronic device of claim 1 wherein said sheet of acoustic-reflecting material has a rectangular shape.

5. The acoustic noise-reduction cover or hood for an electronic device of claim 1, further including a plurality of flaps or fingers extending from a top edge of said sheet of flexible acoustic-reflecting material, an outside pair of said flaps or fingers having a rectangular shape with attachment means thereon so that said flaps of said pair can be attached together or to a top of said electronic device, and wherein the rest of said flaps or fingers having a tapering shape so they will have reduced overlap when said sheet is bent and said flaps or fingers extend over a top of said electronic device.

6. The acoustic noise-reduction cover or hood for an electronic device of claim 1 wherein said means for attaching said edge portions of said sheet of flexible acoustic-reflecting material to said sides of said electronic device comprises a pair of strips of hook-and-loop material attached to said edge portions of said sheet with adhesive on the external surfaces thereof, said adhesive being covered by a pair of respective release strips to protect said adhesive.

7. The acoustic noise-reduction cover or hood for an electronic device of claim 1 wherein said sheet of flexible acoustic-reflecting material has a rectangular shape and said means for attaching said edge portions of said sheet to the sides of said electronic device comprises a pair of strips of hook-and-loop material attached to said edge portions of said sheet with adhesive on the external surfaces thereof, said adhesive being covered by a pair of respective release strips to protect said adhesive, and further including a plurality of flaps or fingers extending from a top edge of said sheet of flexible acoustic-reflecting material, an outside pair of said flaps or fingers having a rectangular shape with attachment means thereon so that said flaps of said pair can be attached together or to a top of said electronic device, the rest of said flaps or fingers having a tapering shape so they will have reduced overlap when said sheet is bent and said flaps or fingers extend over a top of said electronic device.

8. The acoustic noise-reduction cover or hood for an electronic device of claim 1 wherein said sheet of flexible acoustic-reflecting material is constructed from material selected from the group consisting of metals, plastics, composites, rubbers, ceramics, metal filled rubber, wood, processed wood, leather, vinyl, and combinations thereof.

9. The acoustic noise-reduction cover or hood for an electronic device of claim 1 wherein said layer of acoustic-absorbing material is selected from the group consisting of foam, fiberglass, batting material, open-cell melamine foams, polyurethanes, urethanes, thermoplastics, and combinations thereof.

10. The acoustic noise-reduction cover or hood for an electronic device of claim 1 wherein said means for attaching said edge portions of said sheet of flexible acoustic-reflecting material to said sides of said electronic device is selected from the group consisting of adhesives, tapes, hook-and-loop fasteners, adjustable straps, magnets, the weight of said sheet, and combinations thereof.

11. The acoustic noise-reduction cover or hood for an electronic device of claim 1 wherein said electronic device is a personal computer having a tower chassis and said sheet of flexible acoustic-reflecting material is attached to said tower chassis of said personal computer.

12. An acoustic noise-reduction cover or hood for an electronic device such as a computer that contains a fan with an air outlet on a air-outlet side of said electronic device, said electronic device also containing a pair of bordering sides adjacent and bordering opposite sides of said air-outlet side, comprising:
- a sheet of acoustic-reflecting material having an inside surface, an opposing outside surface, and a plurality of edges, namely a bottom edge, a top edge, and two side edges, the width of said sheet being measured between said side edges,
- said sheet of acoustic-reflecting material being flexible, bendable, or foldable so that it can be bent from a flat condition to a U-shaped condition and back and having a predetermined size so that a pair of opposing edge portions of said sheet can be affixed to said pair of bordering sides of said electronic device and the portion of said sheet between said opposing edges will can extend over in a spaced relation from said air-outlet side of said electronic device so as to allow air from said air outlet to exit said air-outlet side,
- a layer of flexible acoustic-absorbing material attached to said inside surface of said sheet of flexible acoustic-reflecting material, thereby to form a composite sheet,
- the width of said composite sheet having a predetermined size so that when it is bent to said U-shaped condition, and its opposing edges are attached to said bordering sides of said electronic device having said air-outlet side and a width within a predetermined range of sizes, said composite sheet will extend over said air-outlet side of said electronic device in a spaced relation from said air-outlet side so as to provide a gap between said sheet and said air-outlet side of said electronic device and an open area at the top or bottom of said sheet to allow air from said air outlet to exit said air-outlet side and flow past at least one of said bottom or top edges of said sheet,
- said layer of flexible acoustic-absorbing material being free of any acoustic reflecting material covering so that when said composite sheet is attached to said electronic device said layer will face said air-outlet side of said electronic device directly so as to be able to absorb sound from said electronic device,
- said composite sheet also having a plurality of flaps or fingers extending from a top edge of said composite sheet, a pair of said flaps or fingers having attachment means thereon so that said flaps of said pair can be attached together or to a top of said electronic device, whereby said flaps or fingers thereof can be positioned to overlap each other and extend over a top of said electronic device,
- said inside of said composite sheet also having, on a pair of edge portions of said sheet adjacent said side edges of said sheet, means for attaching said edge portions of said sheet to said bordering sides of said electronic device,
- said composite sheet being flexible enough to be stored and shipped in a flat or bent condition and be bent from a flat condition to a U-shaped condition and attached to bordering sides of electronic devices of a range of sizes so that said cover will be spaced from and not block said air outlet and will have an open area to allow air from said air outlet to escape.

13. The acoustic noise-reduction cover or hood of claim 12 wherein an outside pair of said flaps or fingers extending from a top edge of said sheet of, acoustic-reflecting material have a rectangular shape with attachment means thereon so that said flaps of said pair can be attached together or to a top of said electronic device, and wherein the rest of said flaps or fingers have a tapering shape so they will have reduced overlap when said sheet is bent and said flaps or fingers extend over a top of said electronic device.

14. The acoustic noise-reduction cover or hood for an electronic device of claim 12 wherein said layer of flexible acoustic-absorbing material has a width narrower than the width of said sheet of acoustic-reflecting material so that said edge portions adjacent said side edges are free of said acoustic-absorbing material such that said edge portions can be attached readily to said bordering sides of said electronic device.

15. A method of reducing acoustic noise from an electronic device such as a computer that contains a fan with an air outlet on a side of said electronic device, comprising:
- providing a sheet of acoustic-reflecting material having an inside surface and a predetermined size,
- providing a layer of flexible acoustic-absorbing material on said inside surface of said sheet of acoustic-reflecting material to form a multi-layered sound-blocking sheet,
- said multi-layered sound-blocking sheet being flexible enough to be stored and shipped in a flat or bent condition and to be bent from a flat condition to a U-shaped condition and attached to bordering sides of electronic devices of a range of sizes so that said cover will be spaced from and not block said air outlet and will have an open area to allow air from said air outlet to escape, said layer of flexible acoustic-absorbing material being free of any acoustic reflecting material covering so that when said composite sheet is attached to said electronic device said layer will face said air-outlet side of said electronic device directly so as to be able to absorb sound from said electronic device,
- the width of said multi-layered sound-blocking sheet having a predetermined dimension so that when it is bent to said U-shaped condition, and its opposing edges are attached to said bordering sides of said electronic device having said air-outlet side and a width within a predetermined range of sizes, said sheet will extend over said air-outlet side of said electronic device in a spaced relation from said air-outlet side so as to provide a gap between said sheet and said air-outlet side of said electronic device and an open area at the top or bottom of said sheet to allow air from said air outlet to exit said air-outlet side and flow past at least one of said bottom or top edges of said sheet,
- bending or folding said multi-layered sound-blocking sheet so that it has a generally U-shaped configuration
- attaching a pair of opposing edge portions of multi-layered sound-blocking sheet to said electronic device at a pair of locations on opposite sides of said air outlet so that a portion of said sheet between said opposing edge portions will extend over said air outlet in a spaced relation to said air outlet so as to allow air from said air outlet to exit said air outlet,
- whereby said sheet of acoustic-reflecting material (a) can be attached to said electronic device, (b) will be spaced from and not block said air outlet, (c) will absorb sound from said air outlet, and (d) has an open area to allow air from said air outlet to escape.

16. The method of claim 15, further including providing a plurality of flaps or fingers extending from an edge of said sheet of flexible acoustic-reflecting material, said edge being spaced from said opposing edge portions, a pair of said flaps or fingers having attachment means thereon so that said flaps of said pair can be attached together or to a top of said electronic device, whereby said flaps or fingers thereof can be positioned to overlap each other and extend over a top of said electronic device.

17. The method of claim 15, further including providing a plurality of flaps or fingers extending from an edge of said sheet of flexible acoustic-reflecting material, said edge being spaced from said opposing edge portions, an outside pair of said flaps or fingers having a rectangular shape with attachment means thereon so that said outside pair or flaps can be attached together or to a top of said electronic device, the rest of said flaps or fingers having a tapering shape so they will have reduced overlap when said sheet is bent and said flaps or fingers extend over a top of said electronic device.

18. The method of claim 15 wherein said attaching a pair of opposing edges comprises providing a pair of fasteners on said edge portions of said sheet and attaching said fasteners to mating fasteners on said locations on said electronic device.

19. The method of claim 15 wherein said sheet has a rectangular shape and said attaching a pair of opposing edges comprises providing a pair of fasteners on said edge portions of said sheet and attaching mating fasteners to said locations on said electronic device.

20. The method of claim 15 wherein said layer of acoustic-absorbing material has a width shorter than the width of said sheet of acoustic-reflecting material so that said edge portions are free of said acoustic-absorbing material so that said edge portions can be attached readily to said bordering sides of said electronic device.

* * * * *